United States Patent
Bordes et al.

(10) Patent No.: US 12,108,087 B2
(45) Date of Patent: Oct. 1, 2024

(54) INTER-PREDICTION PARAMETER DERVIATION FOR VIDEO ENCODING AND DECODING

(71) Applicant: InterDigital CE Patent Holdings, SAS, Paris (FR)

(72) Inventors: Philippe Bordes, Laille (FR); Antoine Robert, Mézières sur Couesnon (FR); Fabrice Le Leannec, Mouazé (FR); Franck Galpin, Thorigne-Fouillard (FR)

(73) Assignee: InterDigital CE Patent Holdings, SAS, Wilmington, DE (US)

( * ) Notice: Subject to any disclaimer, the term of this patent is extended or adjusted under 35 U.S.C. 154(b) by 246 days.

(21) Appl. No.: 17/436,266

(22) PCT Filed: Mar. 26, 2020

(86) PCT No.: PCT/EP2020/058627
§ 371 (c)(1),
(2) Date: Sep. 3, 2021

(87) PCT Pub. No.: WO2020/193736
PCT Pub. Date: Oct. 1, 2020

(65) Prior Publication Data
US 2022/0256200 A1 Aug. 11, 2022

(30) Foreign Application Priority Data

Mar. 28, 2019 (EP) ..................................... 19305400
Sep. 23, 2019 (EP) ..................................... 19306160

(51) Int. Cl.
*H04N 19/80* (2014.01)
*H04N 19/105* (2014.01)
(Continued)

(52) U.S. Cl.
CPC ........... *H04N 19/80* (2014.11); *H04N 19/105* (2014.11); *H04N 19/159* (2014.11); *H04N 19/172* (2014.11)

(58) Field of Classification Search
CPC .... H04N 19/80; H04N 19/105; H04N 19/159; H04N 19/172
(Continued)

(56) References Cited

U.S. PATENT DOCUMENTS

| 2015/0085930 A1 | 3/2015 | Zhang et al. |
| 2020/0366924 A1* | 11/2020 | Rusanovskyy ...... H04N 19/196 |
| 2022/0286689 A1* | 9/2022 | Nam ...................... H04N 19/54 |

OTHER PUBLICATIONS

Chen et al, "Algorithm Description for Versatile Video Coding and Test Model 3 (VTM 3)", Joint Video Experts Team (JVET) of ITU-T SG 16 WP 3 and ISO/IEC JTC1/SC29/WG11, Document: JVET-L1002-v1, 12th Meeting, Macao, China, Oct. 3, 2018, 48 pages.

(Continued)

*Primary Examiner* — Ayman A Abaza
(74) *Attorney, Agent, or Firm* — Condo Roccia Koptiw LLP

(57) ABSTRACT

Video processing such as encoding and/or decoding a picture can involve deriving an inter-prediction parameter based on first and second merge candidates used to generate a pairwise merge candidate, wherein the inter-prediction parameter comprises at least one of an index for weighted bi-prediction or an interpolation filter index; and encoding at least a portion of the picture information based on the inter-prediction parameter.

6 Claims, 24 Drawing Sheets

Example of workflow for the derivation of IF[PW].

(51) Int. Cl.
    *H04N 19/159*     (2014.01)
    *H04N 19/172*     (2014.01)

(58) Field of Classification Search
    USPC .................................................. 375/240.26
    See application file for complete search history.

(56) References Cited

OTHER PUBLICATIONS

Robert (Interdigital), et al.,: "Non-CE4 : BCW inheritance for pairwise", Joint Video Experts Team (JVET) of ITU-T SG 16 WP 3 and ISO/IEC JTC 1/SC 29/WG 11; 15th Meeting: Gothenburg, SE, Jul. 3-12, 2019; Document: JVET-O0516; 7 pages.

"Working Draft 4 of Versatile Video Coding", MPEG Meeting, Nov. 14-18, 2019, Marrakech, Motion Picture Expert Group or ISO/IEC JTC1/SC29/WG11, No. n18274, Mar. 14, 2019, 302 pages.

"Test Model 3 of Versatile Video Coding (VTM 3)", MPEG Meeting, Oct. 8-12, 2018, Macao, (Motion on Picture Expert Group or ISO/IEC JTC1/SC29/WG11), No. n18028, 48 pages.

Chen et al., "Algorithm Description for Versatile Video Coding and Test Model 6 (VTM 6)", JVET-O2002-v1, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-80.

Henkel et al., "CE4: Switchable Interpolation Filter (CE4-1.1, CE4-1.2, CE4-1.3, CE4-1.4, CE4-1.5, CE4-1.6, CE4-1.7)", JVET-O0057-v2, Fraunhofer HHI, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-10.

ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.

* cited by examiner

FIG. 17: Example of interpolation filters

FIG. 18: The value of "IF-index" and "MV" allows deriving motion compensation filter.

FIG. 19: Workflow for the derivation of IF[PW] in VVC.

FIG. 20: Co-located storage buffer for motion-information.

FIG. 21: Example of workflow for the derivation of IF[PW].

FIG. 22: Example of workflow for the derivation of IF[PW].

INTER-PREDICTION PARAMETER DERVIATION FOR VIDEO ENCODING AND DECODING

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

At least one example of an embodiment described herein involves a method for encoding picture information, comprising: deriving an inter-prediction parameter based on first and second merge candidates used to generate a pairwise merge candidate, wherein the inter-prediction parameter comprises at least one of an index for weighted bi-prediction or an interpolation filter index; and encoding at least a portion of the picture information based on the inter-prediction parameter.

At least one example of an embodiment described herein involves a method for decoding picture information, comprising: deriving an inter-prediction parameter based on first and second merge candidates used to generate a pairwise merge candidate, wherein the inter-prediction parameter comprises at least one of an index for weighted bi-prediction or an interpolation filter index; and decoding at least a portion of the picture information based on the inter-prediction parameter.

At least one example of an embodiment described herein involves apparatus for encoding picture information, comprising: one or more processors configured to derive an inter-prediction parameter based on first and second merge candidates used to generate a pairwise merge candidate, wherein the inter-prediction parameter comprises at least one of an index for weighted bi-prediction or an interpolation filter index; and encode at least a portion of the picture information based on the inter-prediction parameter.

At least one example of an embodiment described herein involves apparatus for decoding picture information, comprising: one or more processors configured to derive an inter-prediction parameter based on first and second merge candidates used to generate a pairwise merge candidate, wherein the inter-prediction parameter comprises at least one of an index for weighted bi-prediction or an interpolation filter index; and decode at least a portion of the picture information based on the inter-prediction parameter.

In general, at least one example of an embodiment as described herein provides a computer readable storage medium having stored thereon instructions for encoding or decoding video data in accordance with one or more aspects and/or embodiments described herein; and/or a non-transitory computer readable medium storing executable program instructions to cause a computer executing the instructions to perform a method according to any embodiment in accordance with the present disclosure; and/or an electronic device including apparatus as described herein and one or more additional features such as a display or antenna, etc.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

In a block-based video codec, some coding parameters are signaled for each block. Advantageously, some coding parameters may be inherited from, or derived from, spatially or temporally co-located neighboring blocks.

For example, as described in detail below, one or more indices may be derived. One example of derivation of an index involves derivation of an index designated a generalized bi-prediction (e.g., GBi) of a pairwise merge candidate. A pairwise merge candidate can be improved by deriving its generalized bi-prediction weight (or bi-prediction with CU weight BiCW or Bi-prediction with Weight Average BPWA), together with its motion vectors.

Another example explained in detail below involves an index associated with interpolation filtering. A video codec may include interpolation filtering with selectable or switchable filter characteristics. Control of the filter characteristics may be based on a parameter such as an interpolation-filter index that can be signaled in the bitstream. In general, at least one embodiment described herein involves deriving an interpolation-filter index in the case of a pairwise merge candidate.

Figure 1:
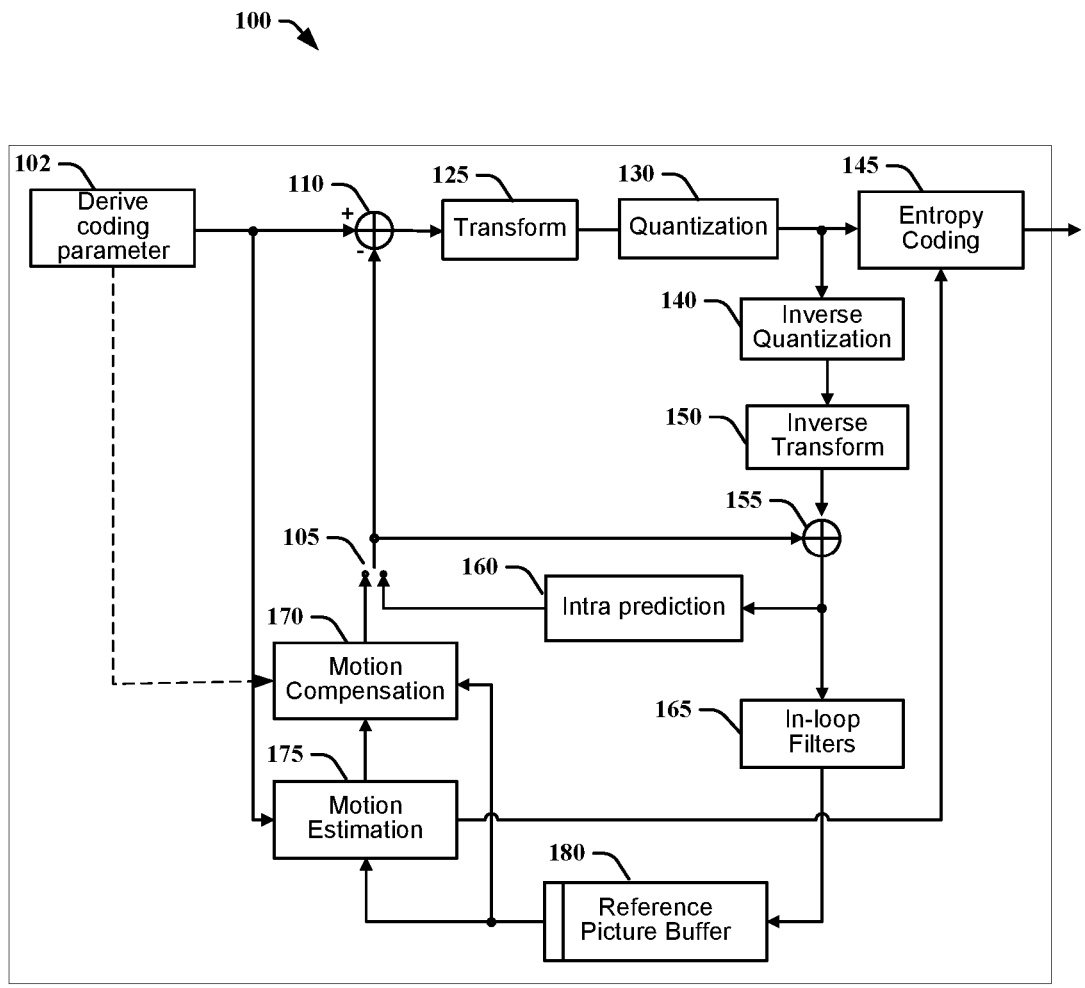
FIG. 1 provides a block diagram depicting an example of an embodiment of a video encoder.

Turning now to the figures, FIG. 1 illustrates an example of a video encoder 100, such as an HEVC encoder. HEVC is a compression standard developed by *Joint Collaborative Team on Video Coding (JCT-VC)* (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). Variations of this encoder 100 are contemplated. However, for clarity, the encoder 100 is described below without describing all expected variations. For example, FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

For ease of explanation, one or more aspects and/or examples of embodiments and/or examples of features described herein may be described in the context of a particular standard such as HEVC or VVC. However, reference to VVC or any other particular standard is not intended to limit, and does not limit, the scope of potential application of the various embodiments and features described herein.

In the present application, the terms "reconstructed" and "decoded" may be used interchangeably, the terms "pixel" and "sample" may be used interchangeably, and the terms "picture" and "frame" may be used interchangeably.

Before being encoded, the video sequence that is input to encoder 100 may go through pre-encoding processing, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

In the present application, the term "block" can be used to refer, for example, to any of CTU, CU, PU, TU, CB, PB, and TB. In addition, the "block" can also be used to refer to a macroblock and a partition as specified in H.264/ AVC or other video coding standards, and more generally to refer to an array of data of various sizes.

In the encoder (100), a picture is encoded by the encoder elements as described below. The picture to be encoded can be partitioned as described above and processed in units of, for example, CUs. Coding parameters can be obtained at (102) and, for example, provided to functions such as motion compensation (170) within encoder (100). Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

Figure 2:
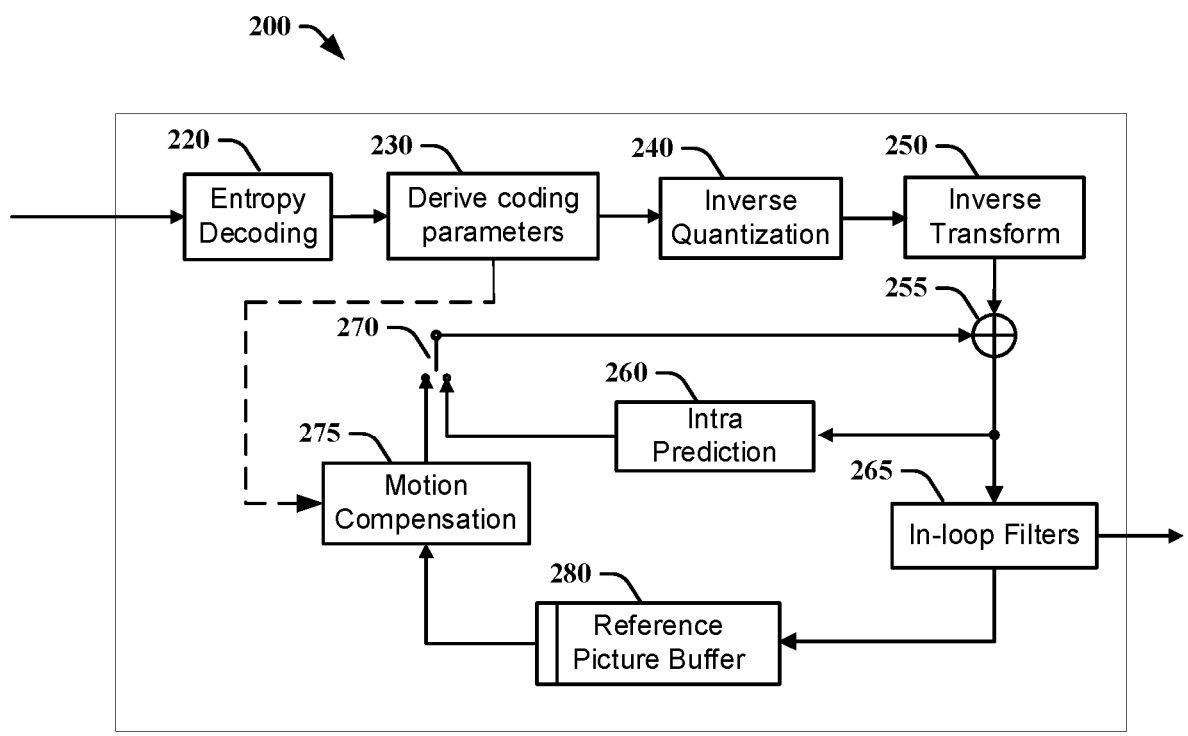
FIG. 2 provides a block diagram depicting an example of an embodiment of a video decoder.

FIG. 2 illustrates a block diagram of a video decoder (200). In the decoder (200), a bitstream is decoded by the decoder elements as described below. Video decoder (200) generally performs a decoding pass reciprocal to the encoding pass as described in FIG. 1. The encoder 100 also generally performs video decoding as part of encoding video data.

In particular, the input of the decoder includes a video bitstream, which can be generated by video encoder (100). In decoder (200), the bitstream is first entropy decoded (220) to obtain transform coefficients, motion vectors, and other coded information. For example, partition information indicating how the picture is partitioned can be obtained and the decoder may then divide the picture according to the decoded picture partitioning information. Following entropy decoding, coding parameters are derived at (230) and provided to various other functions such as motion compensation (275) within decoder (200). The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing, for example, an inverse color transform (e.g. conversion from YCbCr 4:2:0 to RGB 4:4:4) or an inverse remapping performing the inverse of the remapping process performed in a the above-mentioned pre-encoding processing prior to encoder (100). The post-decoding processing can use metadata derived in the pre-encoding processing and signaled in the bitstream.

Figure 3:
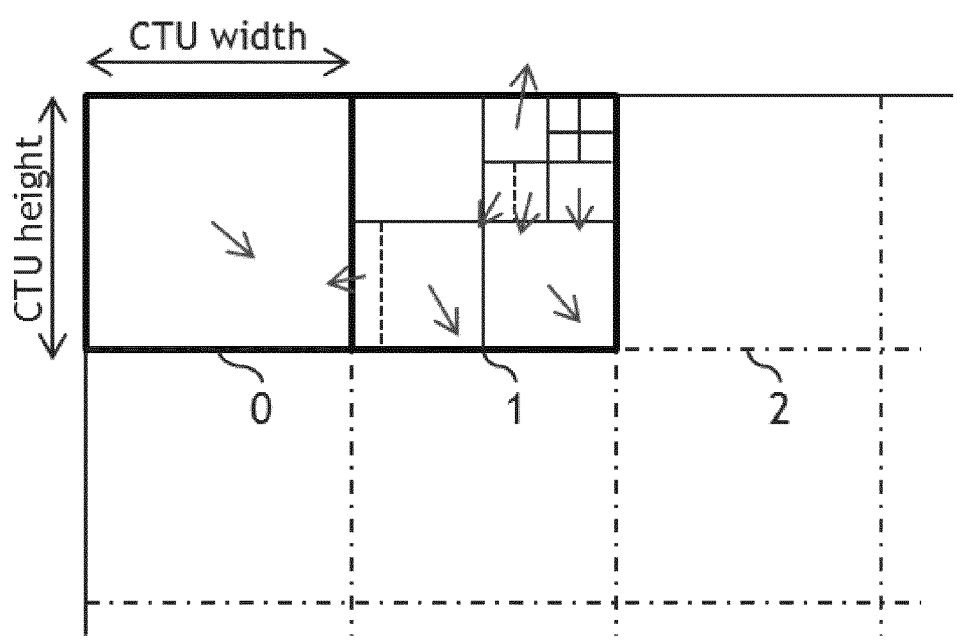
FIG. 3 illustrates aspects of the present disclosure involving a Coding Tree Unit (CTU)

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
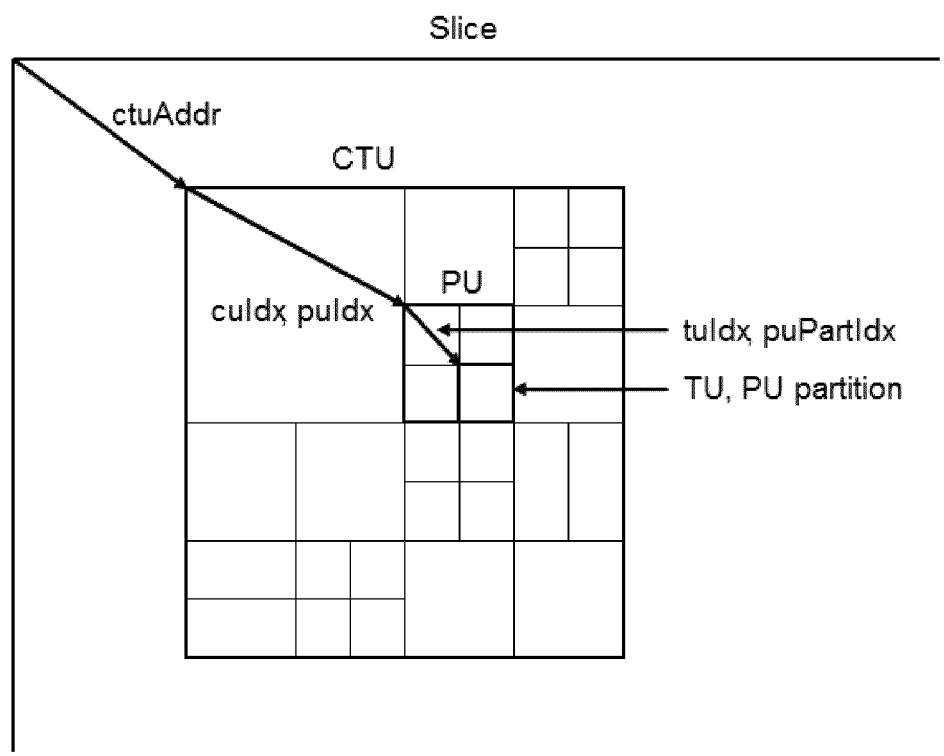
FIG. 4 illustrates aspects of the present disclosure involving a CTU and Coding Unit (CU)

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units.

Exactly one Motion Vector is assigned to each PU in HEVC. This motion vector is used for motion compensated temporal prediction of the considered PU. Therefore, in HEVC, the motion model that links a predicted block and its reference block involves a translation.

Two modes are employed in HEVC to encode the motion data. They are respectively called AMVP (Adaptive Motion Vector Prediction) and Merge. AMVP involves signaling the reference picture(s) used to predict current PU, the Motion Vector Predictor index (taken among a list of two predictors) and a motion vector difference. In general, at least one embodiment as described herein involves the merge mode.

The merge mode comprises signaling and decoding the index of some motion data collected in a list of motion data predictors. The list is made of five candidates and is constructed the same way on the decoder and the on encode sides. Therefore, the merge mode aims at deriving some motion information taken from the merge list. The merge list typically contains the motion information associated to some spatial and temporal surrounding blocks, available in their decoded state when the current PU is being processed.

Certain approaches to video encoding and decoding may be based on different types of merge candidates. For example, an approach can involve two types of candidates designated history-based motion vector predictor (HMVP) candidates and pairwise-average candidates. Ordering of the candidates in the merge list can include a HMVP candidate being inserted in the merge list before any pairwise average candidates.

The pairwise candidates are computed based on pairs of two motion vectors already present in the merge candidate list under construction. The averaging applies both on motion vectors related to the reference picture lists 0 and 1, in case of bi-predictive motion vectors. Pairs of two already present motion vectors are averaged regardless of the coherency between the two considered motion vectors (MVs). As a result, one example of a possible situation is that motion vectors that would point to two reference pictures with different temporal distance to the current picture are being averaged. Some approaches to generating the average between motion vectors may include having these motion vectors first undergo a scaling process, which takes into account the temporal distance between the current picture and the two reference pictures the two motion vectors are pointing to. Such scaling ensures the coherency between the motion vectors before averaging them. However, the scaling operations imply an increased complexity compared to other pairwise average candidate computation approaches. Thus, scaling operations may not be desirable due to complexity considerations.

Merge mode in the HEVC standard involves deriving the inter prediction information (also called motion information in the following) of a given prediction unit from a selected motion information predictor candidate. The motion information includes all the inter prediction parameters of a PU, that is to say:

The uni-directional or bi-directional temporal prediction type

The reference picture index within each reference picture list

The motion vector(s)

Figure 5:
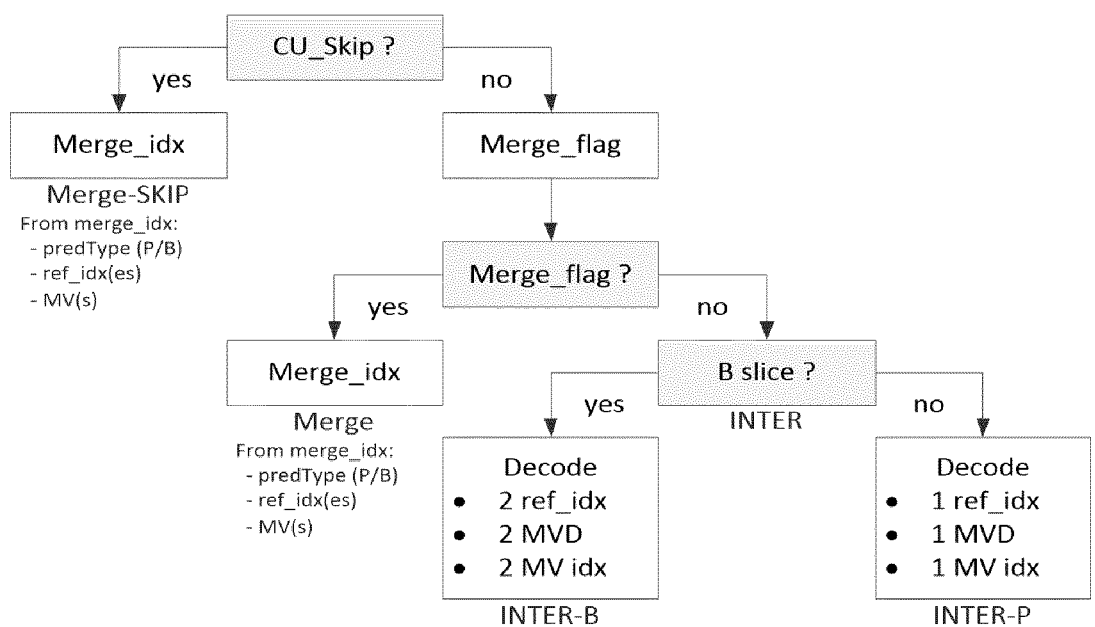
FIG. 5 provides a flow diagram illustrating signaling of inter prediction information.

The coding and decoding of inter prediction information in HEVC is summarized in FIG. 5 which illustrates signaling of the inter prediction information. As can be seen, the motion information coding/decoding according to the merge mode takes place in two modes: the skip mode and the merge mode. In these two modes, one single field is being signaled to make the decoder able to retrieve the motion information of a PU: the so-called merge index. The merge index indicates which Motion Vector predictor in the list of merge motion information predictor is used to derive the motion information of current PU. In the following, the list of motion information predictors is called the merge list, or merge candidate list. Moreover, a candidate motion information predictor is called a merge candidate.

Figure 6:
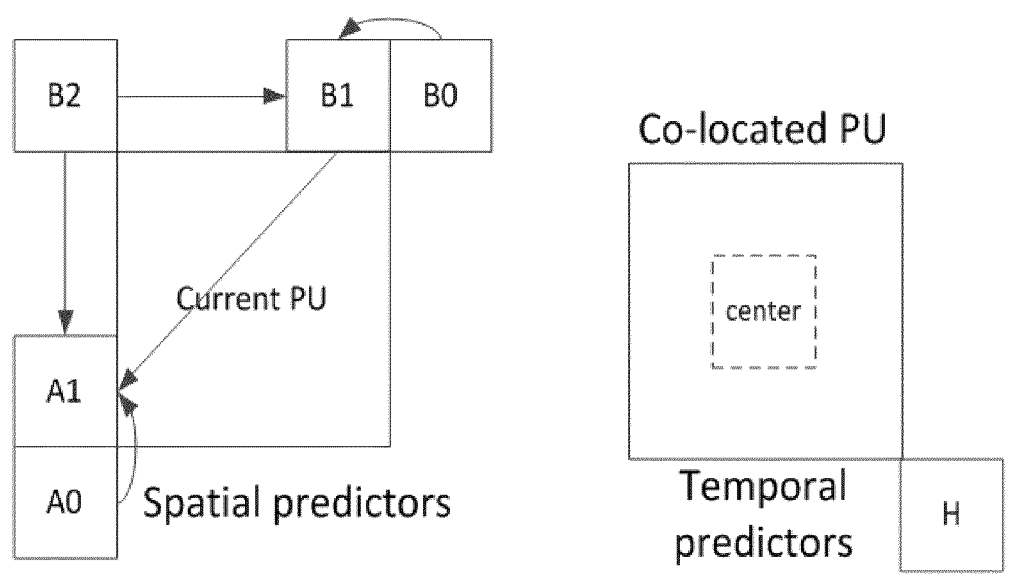
FIG. 6 provides a block diagram illustrating positions of spatial and temporal motion vector predictors used in merge mode.
Figure 7:
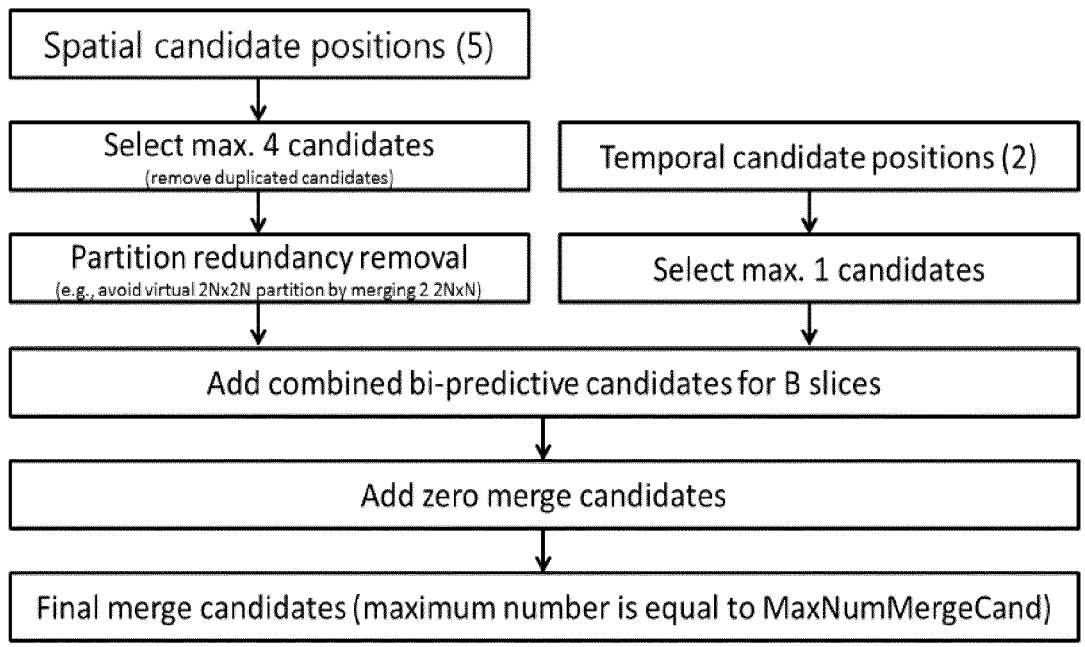
FIG. 7 provides a flow diagram illustrating creating the list of merge motion vector predictor candidates.

In HEVC, the merge candidate list is systematically made of five merge candidates. The merge list is constructed, both on the encoder and on the decoder sides, as follows. As can be seen in FIG. 6, up to five spatial positions can be considered to retrieve some potential candidates. They are visited according to the following order:

1—Left (A1)
2—Above (B1)
3—Above right (B0)
4—Left bottom (A0)
5—Above left (B2)

where the symbols A0, A1, B0, B1, B2 denote the spatial position shown on the left side of FIG. 6. In FIG. 6, positions of spatial and temporal motion vector predictors used in the merge mode with spatial merge candidates are illustrated on the left side of FIG. 6 and temporal merge candidates are illustrated on the right side of FIG. 6. Four spatial candidates which are different from each other are selected. Then a temporal predictor denoted TMVP is selected, by considering the temporal motion information located at position H, and then "center" is a candidate at position H in the considered reference picture that is not available. A pruning process then takes place (see FIG. 7), to ensure the selected set of spatial and temporal candidates does not contain redundant candidates.

Figure 8:
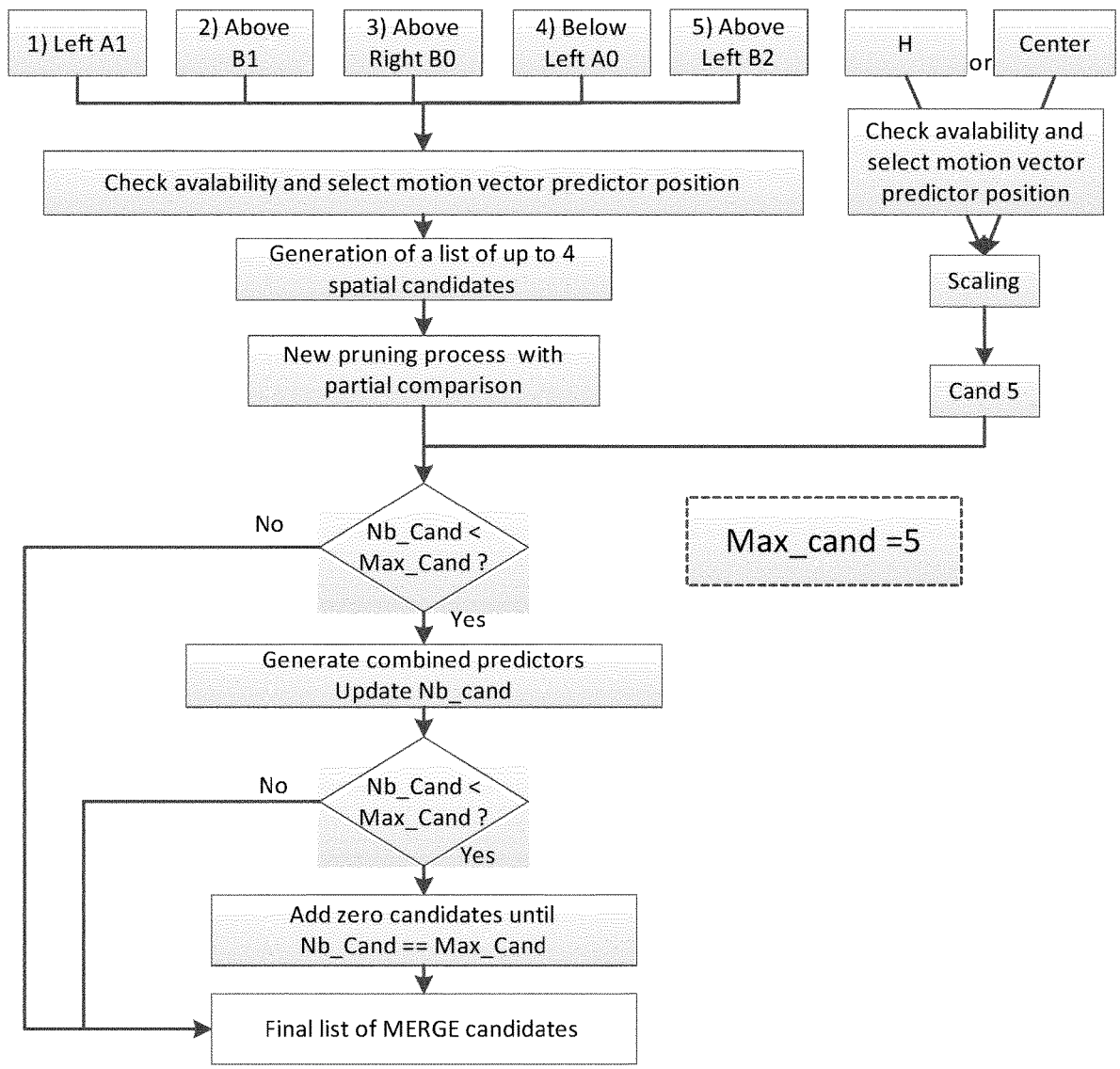
FIG. 8 provides another flow diagram illustrating creating the list of merge motion vector predictor candidates.

Next, in the case of a B slice, candidates of another type are pushed to the merge list if it is not full: the so-called combined candidates. This can involve forming a candidate made of the motion information associated with one reference picture list (L0) from one candidate already present in the list, with the motion associated to the other reference picture list (L1) from another candidate already present in the merge list. If the merge list is still not full (five elements) then zero motion vectors are pushed to the back of the merge list until it is full. The overall process of merge list construction in HEVC is detailed in the diagram of FIG. 8.

In an approach to merge candidate list construction such as that of systems being developed by JVET, so-called pairwise average candidates are added to the merge candidate list, to improve the compression efficiency. These pairwise candidates are computed as follows. For each reference picture list, some pre-defined pairs of candidates are taken from the merge candidate list and are averaged. The merge list is taken in its current state when the pairwise candidates are being computed. A pairwise candidate is formed if one or two candidates are available for the considered reference picture list and at considered position in the merge candidate list. Up to six candidates are considered to enrich the merge candidate list. An example of a process to construct the pairwise average merge candidates is depicted in FIG. 9.

Figure 9:
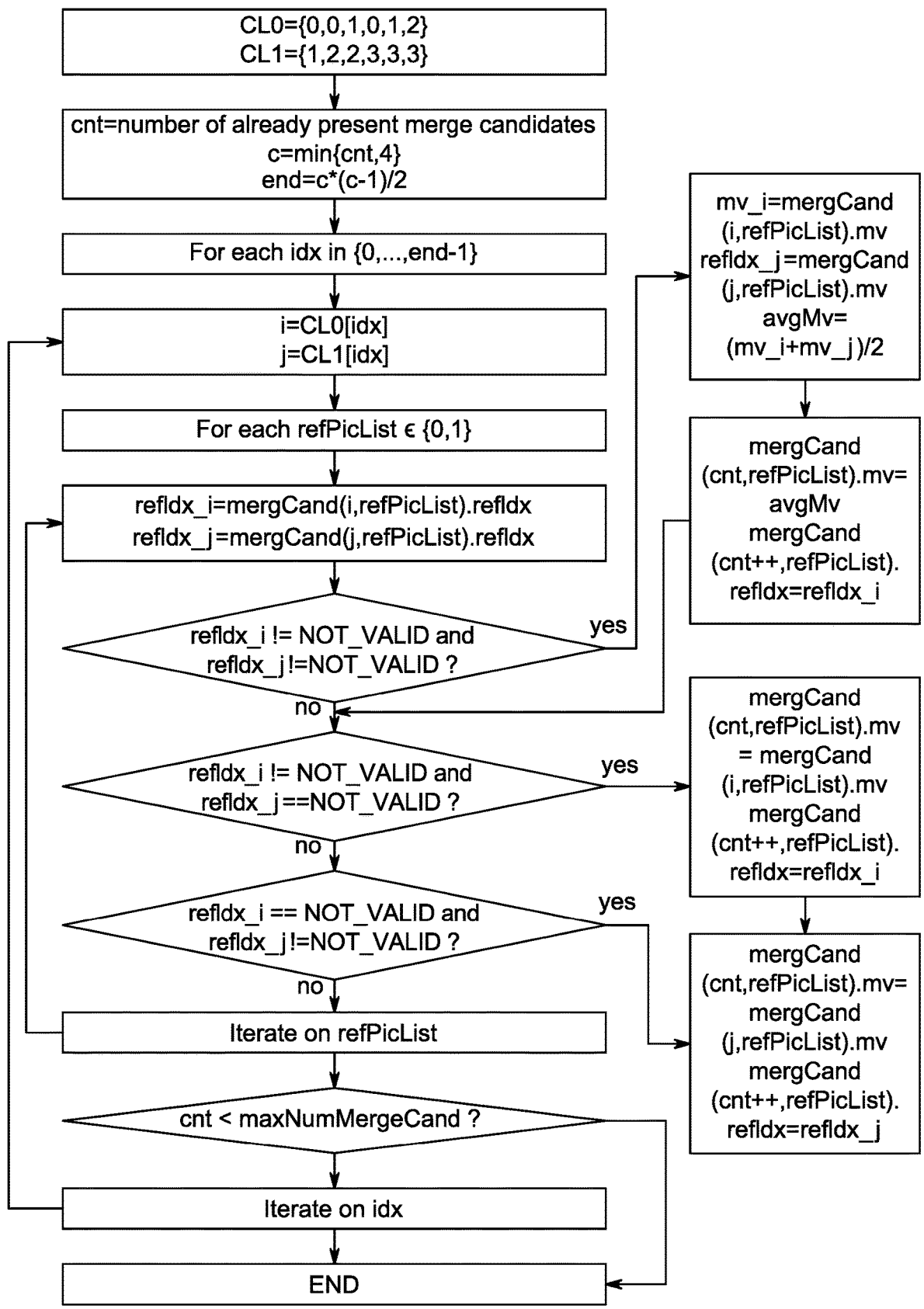
FIG. 9 provides a flow diagram illustrating an example of determining pairwise average merge candidates.

In FIG. 9, first the set of candidate indexes CL0 and CL1 are initialized so as to specify which candidates in the merge candidate list constructed so far are going to be used to compute pairwise average candidates. Then, the maximum number 'end' of pairwise candidates is computed as shown on FIG. 9. Next, a loop over all pair indexes 'idx' is performed. For each value of 'idx', the respective indexes 'i' and 'j' of the merge candidates that are considered to form a pair are taken respectively from the sets CL0 and CL1. Then for each reference picture list value 'refPicList' (equal to L0 and then to L1), the pairwise motion with index and for reference picture refPicList is constructed, if at least one of the reference picture indices of candidates 'i' and 'j' is valid. In case both of the two reference picture indices of candidates 'i' and 'j' are valid, then a pairwise candidate is computed as the average of the two considered motion vectors, and is stored into the list of merge candidates under construction. Moreover, the reference picture index which is assigned to the average motion vector is the reference picture index of the candidate 'i'.

In case only one of the two candidates 'i' or 'j' has valid reference picture index (which means the other one is a uni-dir candidate, which a valid motion vector in the other reference picture list than the current one refPicList), then the formed pairwise motion vector is set equal to the candidate motion vector with a valid reference picture index. Moreover, the reference picture index of the pairwise candidate is set equal to that of the candidate with a valid reference picture index.

The process of FIG. 9 ends when the overall list of merge candidate has reached its maximum number of candidates, or index 'idx' has reached its last value 'end-1' in the considered loop.

Figure 10:
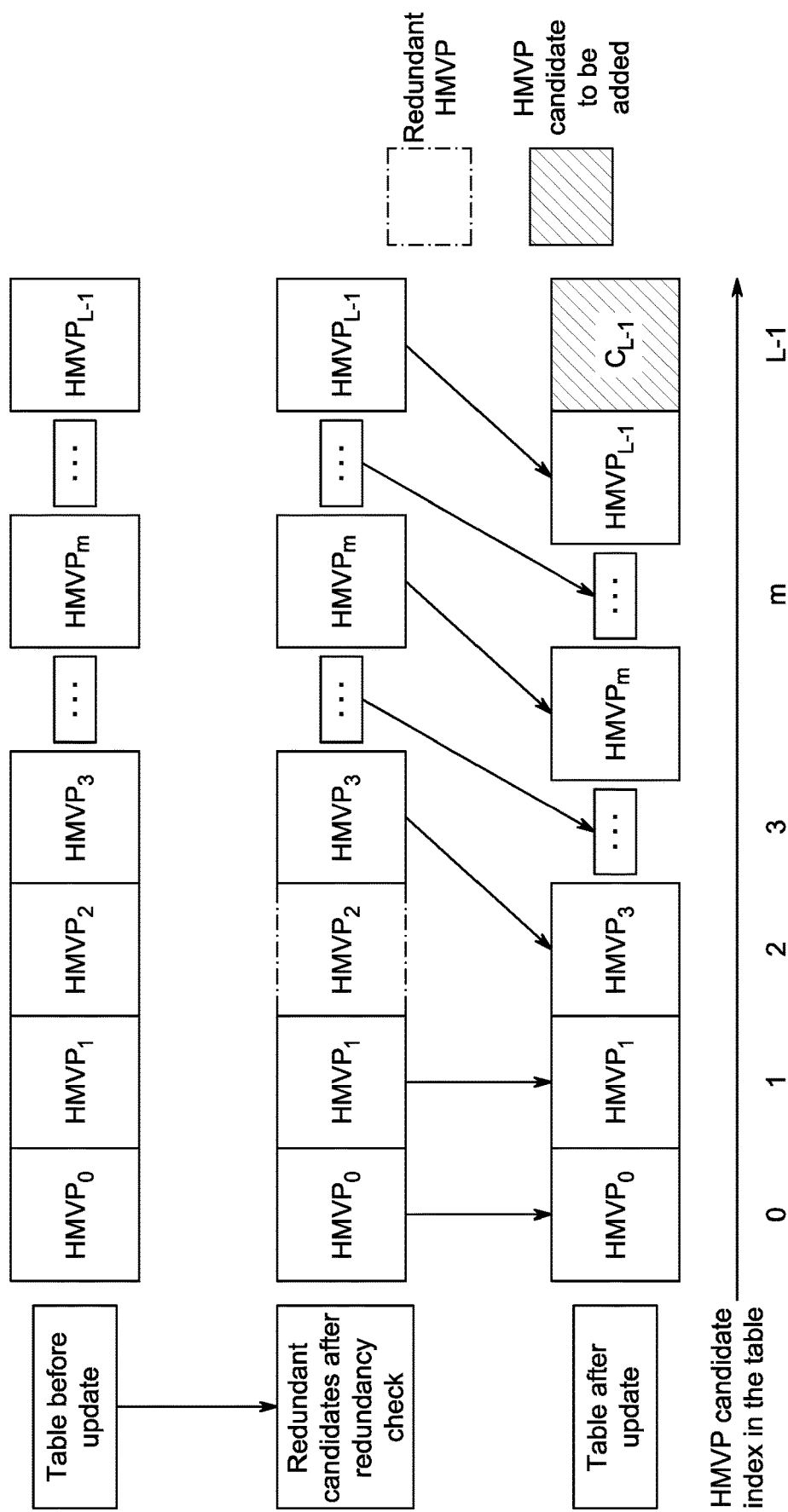
FIG. 10 illustrates an example of updating a merge candidate table based on an approach to history-based motion vector prediction (HMVP)

A merge enhancement tool developed as part of the VVC effort is called history-based motion vector prediction (HMVP). History-based involves maintaining a table comprising multiple motion information components used for the coding of blocks preceding the current block. Each time a non-affine inter block is coded, its associated motion data is added to the end of the table, as a new HMVP merge candidate. The maximum HMVP table is 6, and past motion data is discarded from the table according to the FIFO (First-In-First-Out) rule. The management of the history-based buffer (table) of motion vector predictors is illustrated in FIG. 10.

Figure 11:
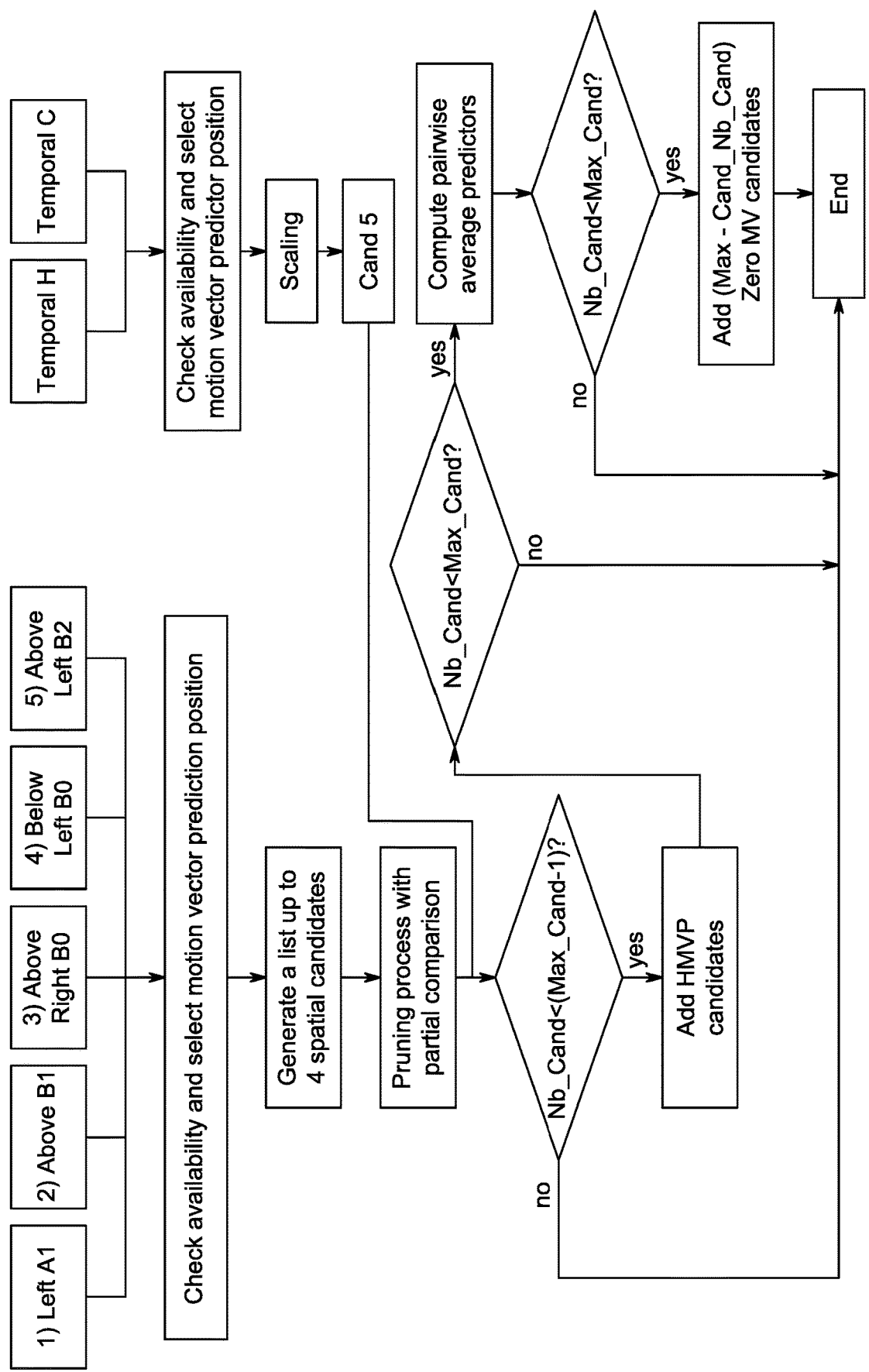
FIG. 11 provides a flow diagram illustrating an example of an approach to non-sub-block merge candidate list construction.

An example of an embodiment for an approach to construction of a non-sub-block-based (or translational) merge candidate list is illustrated in FIG. 11. In FIG. 11, an example of an embodiment for construction of classical (as opposed to affine) merge list construction is illustrated. By "classical", the present description is referring to the merge list used for translational motion compensated temporal prediction, where one motion vector is associated to a CU for each reference picture list. The example illustrated in FIG. 11 corresponds to one or more aspects of the VVC video compression system.

The construction of the classical merge list is enriched compared to HEVC. As can be seen, the same spatial and temporal predictors are used during the first stage of the process of FIG. 11. After the spatial and temporal LV predictors have been added, if the merge list contains at least two free places left, then the HMVP candidates obtained as described above are added to the list. Next, if the list is still not full (i.e., the number of added candidates is less than the allowed maximum number of merge candidates), then some pairwise merge candidates as described above are evaluated and added to the list. Finally, if the classical merge list is still not full, then it is filled with zero motion vectors.

Figure 12:
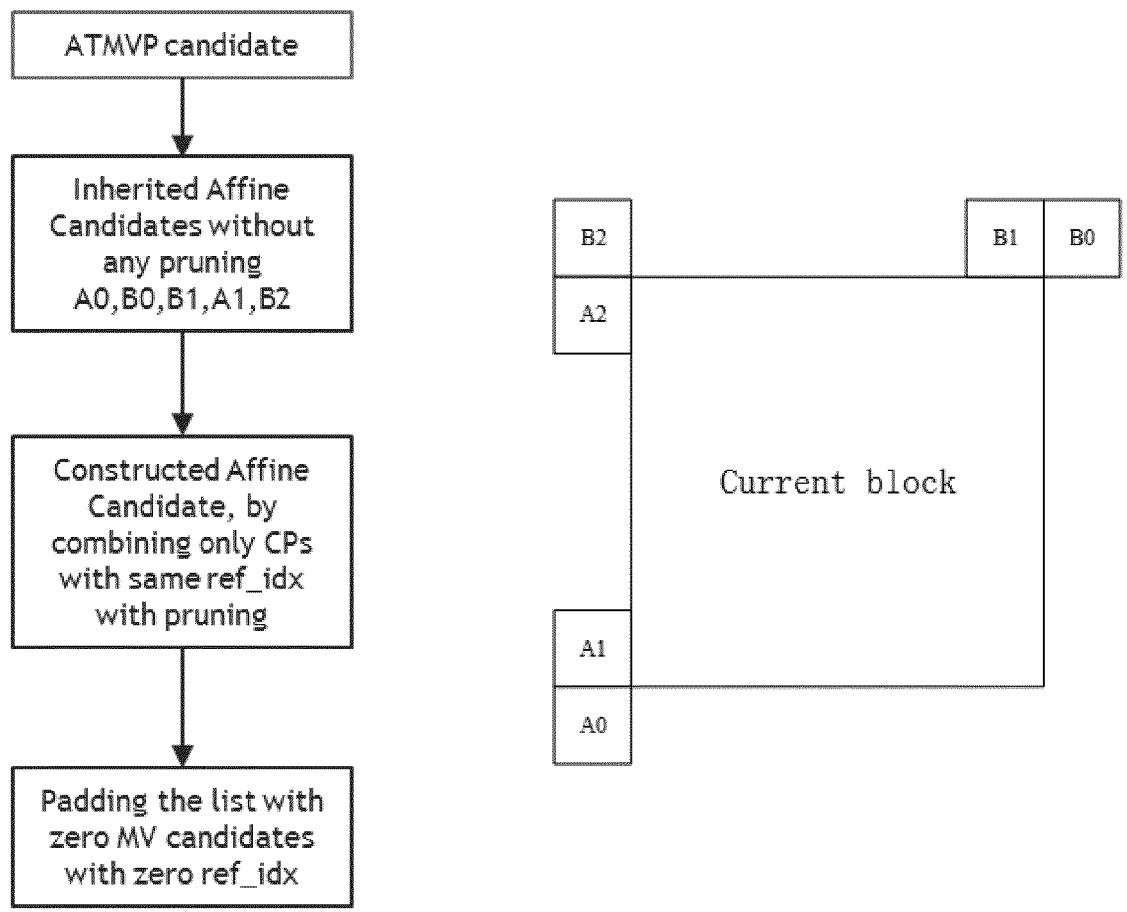
FIG. 12 illustrates an example of construction of a list of sub-block-based motion vector predictor candidates.

An example of an approach to construction of an affine merge list, e.g., as in the VVC system, is illustrated in FIG. 12. In FIG. 12, the affine merge list gathers all merge MV predictors which involve a sub-block-based motion compensated temporal prediction. Thus, this includes the advanced temporal motion vector predictor (ATMVP) merge mode, and affine merge modes. Affine merge candidates represent merge candidates from which an 4×4 block based affine motion field is derived for a current CU and used in the temporal prediction of the current CU. ATMVP involves temporally predicting one or more motion vectors of a current block from an area in a reference picture, pointed to by a motion vector derived from a spatial neighboring block of the current block.

Figure 13:
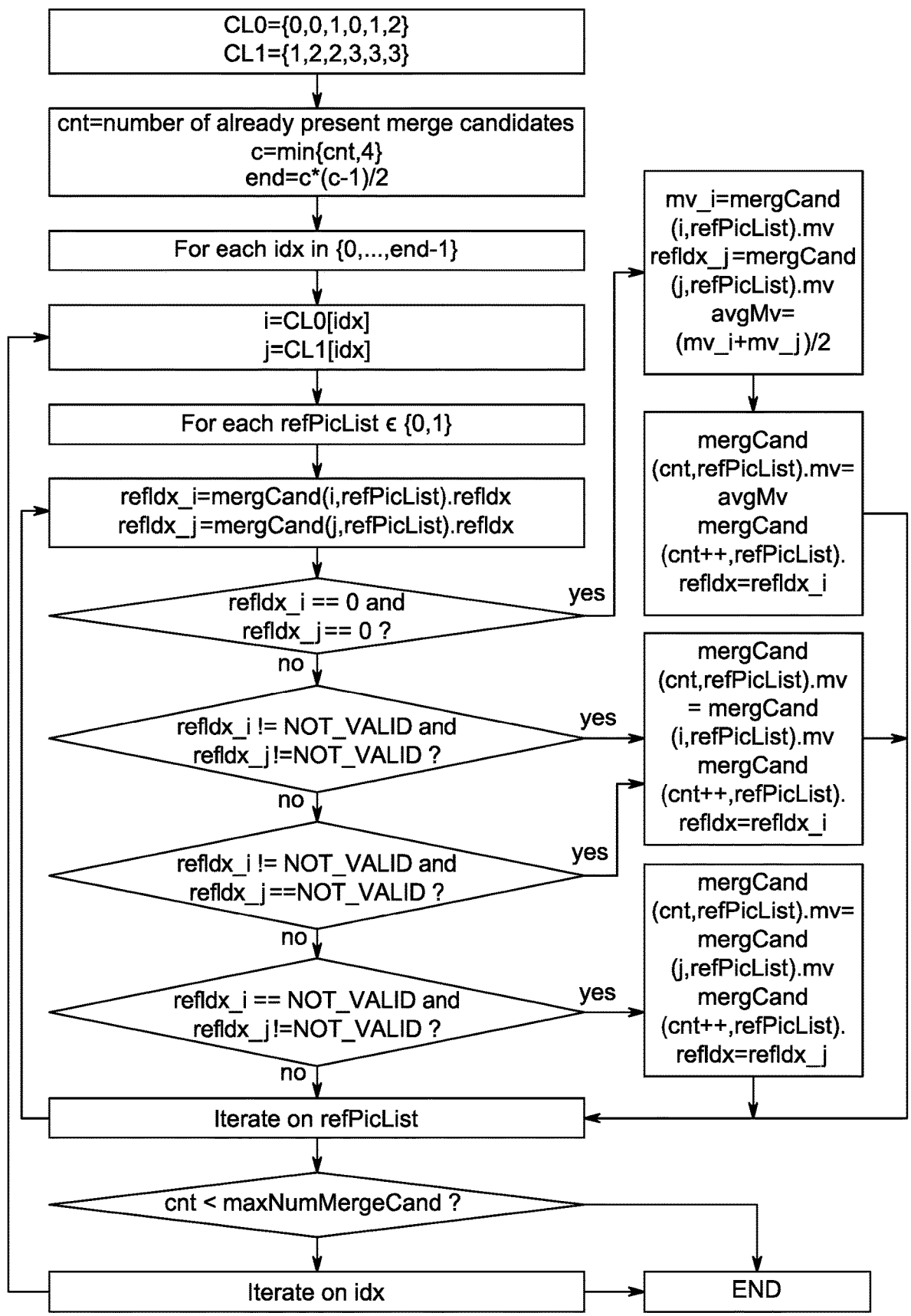
FIG. 13 provides a flow diagram illustrating an example of an embodiment for obtaining pairwise merge candidates.

In accordance with an aspect of the present disclosure, determination of pairwise average candidate(s) can be based on increasing the coherency between averaged pairs of motion vector, while keeping the complexity at a limited level. Various aspects, embodiments, features, etc. will be explained in more detail below. For example, in general, at least one embodiment can involve the pairwise averaging of two candidates being allowed or enabled only if the two candidates have a reference picture index equal to 0, in the considered reference picture list. An example of an embodiment is illustrated in FIG. 13. Also in FIG. 13, if both reference picture indexes are valid but one of them is not equal to 0, then the embodiment of FIG. 13 chooses to consider only candidate 'i' to form the current pairwise candidate MV in the considered reference picture list. According to a variant, the candidate MV with the smallest reference picture index among 'i' and 'j' may be chosen. According to another variant, the merge list ordering may be modified based on pairwise average candidates. For example, pairwise average candidates can be inserted in the merge list before other candidates such as HMVP candidates.

In accordance with another aspect, one or more merge candidates may be obtained based on allowing or enabling pairwise average if both reference picture indexes are equal. In general, an example of at least one embodiment can comprise the pairwise averaging of two candidates being allowed or enabled only if the two candidates have respective reference picture indices which are valid and are equal to each other as illustrated in the example embodiment shown in FIG. 14.

In accordance with another aspect, one or more merge candidates may be obtained based on allowing or enabling pairwise average if both reference picture indexes are valid. In general, an example of at least one embodiment can comprise the pairwise averaging of two candidates is allowed only if the two candidates have respective reference picture indices which are valid. In at least one embodiment, if one reference picture index associated to one of the two considered MVs is equal to twice the other reference picture index, then the pairwise candidate is computed as a simple weighted mean of the two MVs, where the weight value ½ is given to the MV with smallest reference picture index, and the weight ¼ is given to the MV with largest reference picture index as illustrated in FIG. 15.

Figure 14:
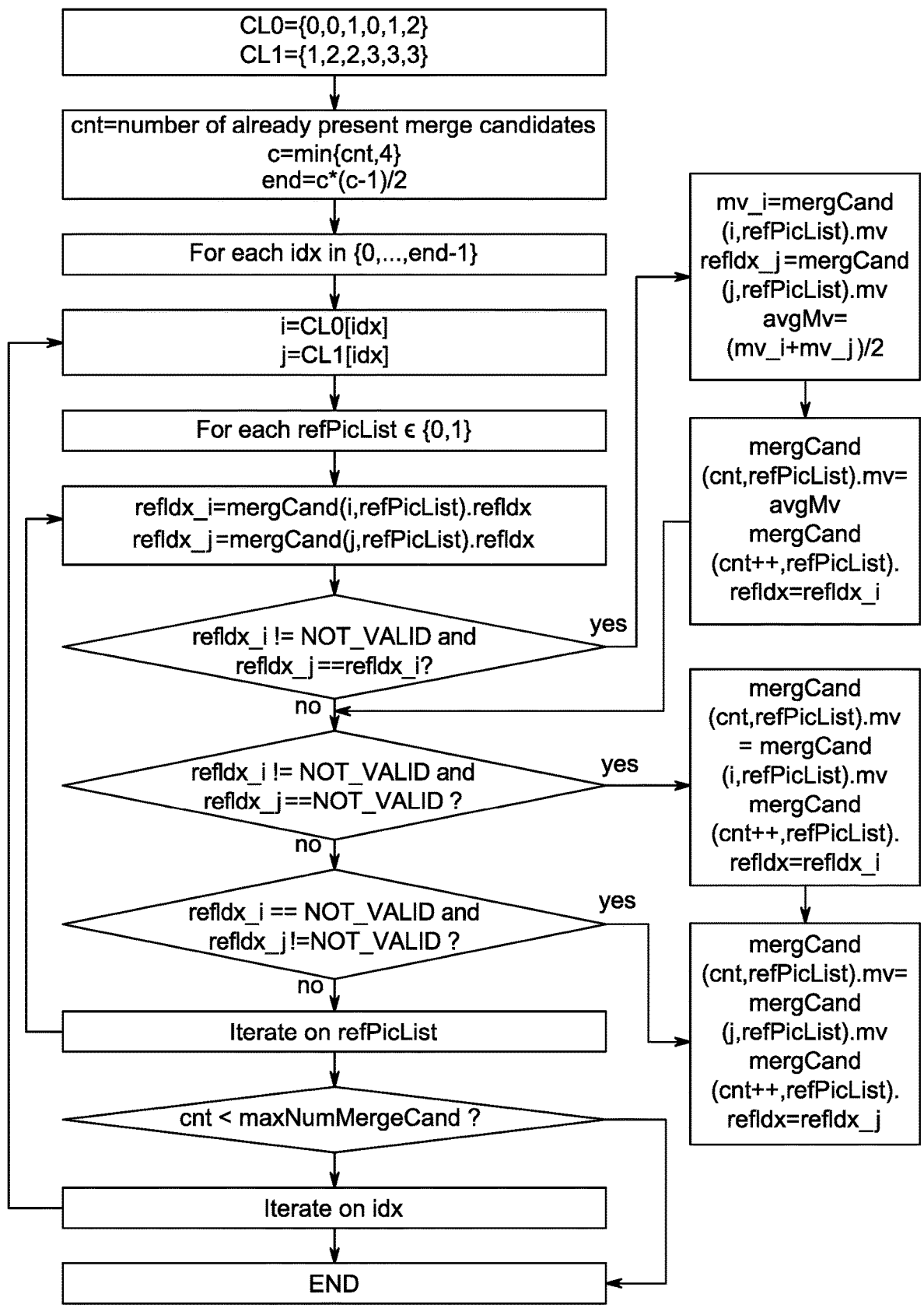
FIG. 14 provides a flow diagram illustrating an example of another embodiment for obtaining pairwise merge candidates.
Figure 15:
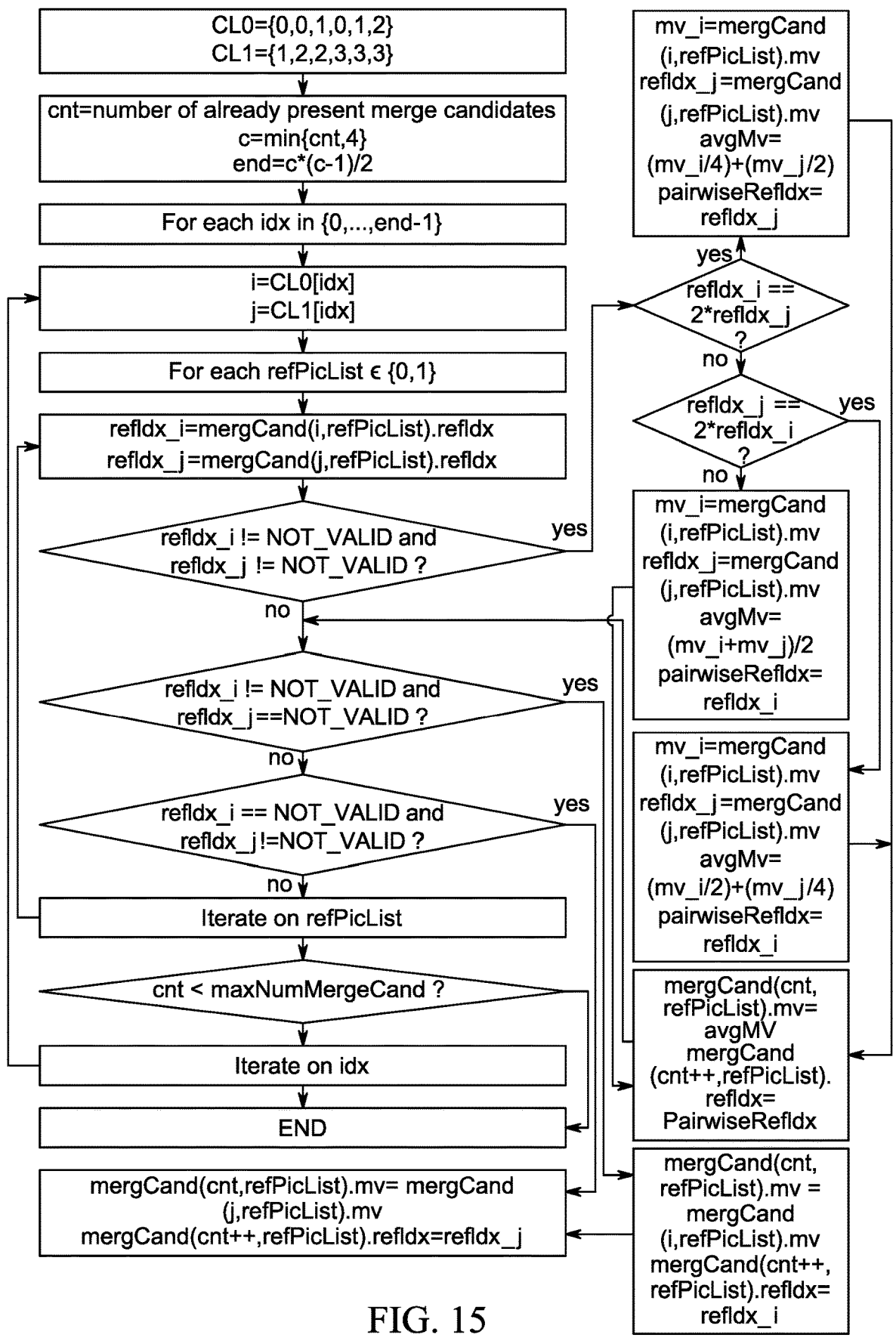
FIG. 15 provides a flow diagram illustrating an example of another embodiment for obtaining pairwise merge candidates.

In accordance with another aspect, one or more features of the examples of embodiments illustrated in FIGS. 14 and 15 can be combined together. For example, in general, at least one embodiment can comprise the averaging of two candidate MVs being allowed or enabled if the two reference picture indices are equal, or one is equal to twice the other one, and averaging two motion vectors to produce a pairwise candidate is not allowed or disabled otherwise, i.e., the two reference picture indices are not equal and one is not equal to twice the other one. In this latter case, if the averaging between the two valid MVs is not enabled, then the process may choose the first one to form the pairwise candidate. According to a variant, the candidate may be selected based on a relationship between the reference picture indices, e.g., among 'i' and 'j' with the smallest reference picture index being chosen.

In accordance with another aspect, one or more merge candidates may be obtained based on allowing or enabling the averaging of two motion vectors according to their MV values. In general, at least one embodiment can comprise putting one or more conditions on the relevance to compute the average of some candidate motion vectors already present in the merge candidate list being constructed for current CU. For example, typically, one understands that if the average of the two MVs is equal or close to the zero motion vector, while the derived motion vectors are far from the zero MV, then the average is likely not relevant to include the averaged candidate into the merge list. In general, at least one embodiment can comprise considering the averaged candidate as potentially relevant, according to the value of the averaged MV relative to the two MVs one wants to average.

For example, in at least one embodiment, the described criteria can take the following form:

If the $L_\infty$ norm of the average motion vector is negligible compared to the $L_\infty$ norm of each retrieved motion vector, then the average motion vector is considered as not usable in the spatio-temporal motion vector predictor (STMVP) merge candidate. Thus, this criteria comprises evaluating the following test:

$$\frac{\left\|\text{Average}\left(\overrightarrow{MV_1}, \overrightarrow{MV_2}\right)\right\|_\infty}{\min\left(\|\overrightarrow{MV_1}\|_\infty, \|\overrightarrow{MV_2}\|_\infty\right)} < \epsilon$$

Where $\epsilon$ is a threshold value. If the above test is true, then the STMVP merge candidate may not be include in the merge candidate list.

In at least one other embodiment, some other norm may be used to compute the above criteria, for instance the L2 or L1 norm. According to another embodiment, another criteria to allow the averaging between two MVs may be based on the scalar product of the two MVs, relative to the product of the L2 norms of the two MVs. This criteria takes the form of the following. The averaging is allowed if the following condition is fulfilled:

$$\frac{\langle \overrightarrow{MV_1}, \overrightarrow{MV_2}\rangle}{\|\overrightarrow{MV_1}\|_2 \times \|\overrightarrow{MV_2}\|_2} > 1 - \epsilon$$

Where $\epsilon$ is a strictly positive value, smaller than 1. Intuitively, one understands it may be relevant to average two MVs to form an additional MV predictor, if the two are "sufficiently" co-linear. This is captured by imposing that the scalar product of the two vectors is positive and sufficiently large.

Figure 16:
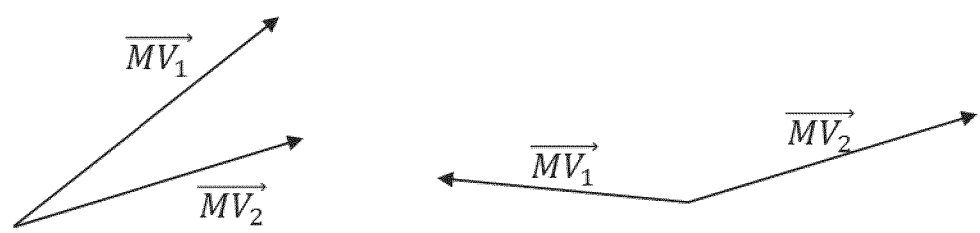
FIG. 16 illustrates examples of cases where averaging of two motion vectors may be relevant or not relevant.

FIG. 16 illustrates examples where averaging two vectors $\overrightarrow{MV_1}$ and $\overrightarrow{MV_2}$ is likely to be relevant or not as a potential candidate for the merge candidate list. The example shown on the left side of FIG. 16 illustrates an example of an arrangement of motion vectors where the averaging of the two motion vectors may be relevant in accordance with the criteria discussed above. The example shown on the right side of FIG. 16 illustrates an example of an arrangement of motion vectors where the averaging of the two vectors may not be relevant.

As mentioned above, at least one other embodiment can involve derivation of an index, e.g., GBi, of the pairwise merge candidate. For example, the pairwise merge candidate can be improved by deriving its generalized bi-prediction weight (or bi-prediction with CU weight BiCW or Bi-prediction with Weight Average BPWA), together with its motion vectors.

BiCW can involve the following. An inter CU can be temporally predicted through the use of so-called generalized bi-prediction. In generalized bi-prediction, the temporal prediction of a bi-predicted block is computed as the weighted average of two reference blocks, according to the following expression:

$$P_{bipred} = ((8-w) \times P_0 + w \times P_1 + 4) >> 3$$

where $P_{bipred}$ represents a bi-predicted block and $P_0$ and $P_1$ are two block predictions computed, for example, as motion compensation of blocks from two reference pictures from the L0 and L1 reference picture lists. The weight w, e.g., GBi weight, can be selected, for example, from among the following sets:

For low-delay pictures (which have all their reference pictures in the past): $w \in \{-2/8, 3/8, 4/8, 5/8, 10/8\}$ For non-low-delay pictures (which have at least one past and one future reference picture): $w \in \{3/8, 4/8, 5/8\}$ The preceding expression is an integer-based formulation of a more generic, floating point-based expression of the form:

$$P_{bipred} = (1-\alpha) \times P_0 + \alpha \times P_1$$

It should be noted that while for an approach such as the example of VVC described herein, $P_0$ and $P_1$ are computed as inter-prediction blocks with motion compensation, other approaches might involve combining other prediction types (e.g. intra and inter predictions) with different weights, for example.

A syntax element can be included in the bitstream to signal a weight used for prediction, e.g., a GBi weight used to predict a CU. Such a syntax element can be referred to as an index for weighted prediction or an index for prediction with weights such as, for example, the GBi index. The index identifies the weighting factor to be used. For example, the index identifies a weight or weighting factor in a set of weights or weighting factors such as the examples of sets of weights above for low delay pictures and for non-low delay pictures. The index can identify a first weight, e.g., $w_1$ for one predictor, e.g., $P_1$ in the equation above. A second weight, e.g., $w_0$ for another predictor, e.g., $P_0$ in the equation above, can be determined or derived based the first predictor, e.g., $w_0 = 1 - w_1$. For merge modes, a weight, e.g., the GBi weight w, can be inherited from the same neighbor as that used for the motion vectors and the reference pictures.

For AMVP modes, the GBi weight w can be selected based on the rate distortion optimization process on the encoder side and signaled in the bit-stream. The index can be coded, for example, at the CU level in AMVP to indicate which weight or weighting factor in a set of weights is to be used for weighted bi-prediction or bi-prediction with weights as described above, GBi can also be combined with various motion compensation tools such as affine motion compensation or adaptive motion vector resolution.

When a pairwise merge candidate is computed, it can be systematically assigned a GBi weight value such as w=4, which corresponds to the bi-prediction case with equal weights ½ and ½ applied on each temporal prediction block. However, when the pairwise merge candidate is being computed from two bi-directional motion vector predictors, and these two MV predictors have the same GBi index, which may be different to the default case of, for example, w=4, it can be appropriate or desirable or useful to assign that same GBi index value to the averaged motion vector prediction candidate. Therefore, in at least one embodiment, when the pairwise motion vector average process is computing a merge candidate from two bi-directional MVs with the same GBi index, the merge pairwise candidate inherits the considered GBi weight.

In at least one other embodiment, if only one of the two motion vector predictors to be averaged is of bi-directional type, then the GBi index assigned to the pairwise merge candidate can be the default GBi index value. Alternatively, if only one of the two motion predictors to be averaged is of bi-directional type, then the GBi index of the bi-directional motion vector can be assigned to the pairwise merge candidate.

If the two motion vector predictors to be averaged are of uni-directional type, e.g., one on each reference picture list, then the pairwise merge candidate mechanism can generate a combined bi-directional candidate and assign the default GBi weight to this combined merge candidate. In at least one other example of an embodiment, a GBi weight can be assigned to the combined pairwise merge candidate, such that a higher weight value is associated to the inter prediction direction in which the combined bi-directional merge candidate points to a reference picture closer to the current picture, in terms of temporal distance.

In at least one other embodiment, if the two input motion vectors to the pairwise computation process are of bi-directional type with different GBi weights, the average of the weights of the two input MVs can be assigned to the pairwise merge candidate. If needed, the average weight value can be rounded to either the closest value of equal weight or away from this equal weight.

In at least one other embodiment, if the two input motion vectors to the pairwise computation process are of bi-directional type, the pairwise candidate is computed only if these two MVs have equal GBi weights. Otherwise, some other candidates in the merge list under construction are considered in order to generate the pairwise candidate. An iterative process to search a pair of MVs which may combine an unidirectional MV with a bi-directional MV or two bi-directional MVs with equal GBi weights can be invoked until such a pair of merge candidates is found in the merge list under construction.

In at least one other embodiment, if the first motion vector predictor (e.g., candidate i in FIG. 9) is bi-directional, both its reference pictures are used to construct the pairwise candidate. Then, the GBi weight of this first motion vector predictor is assigned to the pairwise merge candidate. Otherwise, if the second motion vector predictor considered to construct the pairwise merge candidate (e.g., candidate j in FIG. 9) is bi-directional, a combination of reference pictures can be used (one coming from the first predictor for one reference picture list and one from the second predictor for the other reference picture list). In that case, if the single reference picture from the first candidate is the same as the one of the second predictor (for the same reference picture list), then the GBi weight of this second motion vector predictor is assigned to the pairwise merge candidate and, in any other cases, the GBi weight of the pairwise merge candidate is set to the default one.

As mentioned above, another example of coding parameters being inherited from, or derived from, spatially or temporally co-located neighboring blocks involves deriving an index associated with interpolation filtering. A video codec may include interpolation filtering with selectable or switchable filter characteristics. Control of the filter characteristics may be based on a parameter such as an interpolation-filter index that can be signaled in the bitstream. In general, at least one embodiment described herein involves deriving an interpolation-filter index in the case of a pairwise merge candidate.

Figure 17:
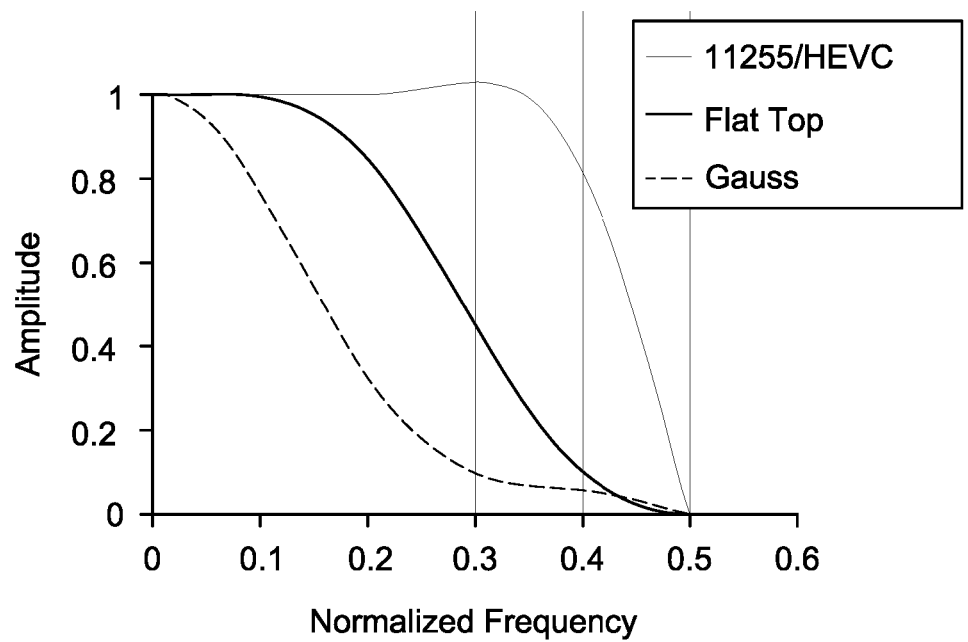
FIG. 17 illustrates an example of interpolation filters.

The principle of a switchable interpolation filter (IF) is to improve the motion compensation prediction by selecting the IF index (IF-idx) to use for each block prediction. The IF associated with each index value may exhibit different characteristics such as the example of different smoothing characteristics illustrated in FIG. 17.

For example, a standard such as VVC might provide for the IF index to be selected per coding unit (CU) and can be derived from the coded "imv" index indicating the resolution of the coded motion vector difference (MVD): if IMV=HALF_PEL, then IF-idx=1 is selected, else IF-idx=0.

In case of a merge mode of operation, the IF index is not coded explicitly but derived from merge candidate(s).

Figure 18:
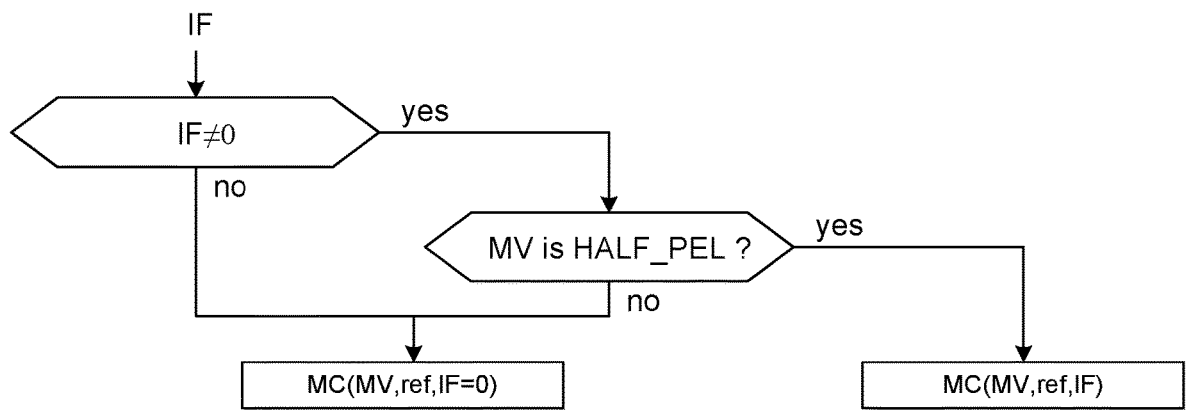
FIG. 18 provides a flow diagram illustrating an example of deriving a motion compensation filter.

As an example, a standard such as VVC might provide for the IF-index value indicating one of two filters: IF-0 or IF-1. However, IF-1 can be used for HALF_PEL motion vector values only. Then, if IF-index is not equal to zero and the motion vector (MV) horizontal (or vertical) component is not HALF_PEL, then IF-0 is used as illustrated in FIG. 18.

For ease of explanation, the following description will generally describe embodiments involving N=2 IF filters (IF=0 and IF=1). However, the aspects, embodiments and features described herein are not limited to the context of N=2 IF filters and can be easily extended to the case N>2 (IF=0, . . . IF=(N−1)) in which case one distinguishes between IF=0 and IF≠0 that correspond to IF=0 and IF=1 in the following. Also, the following may refer to "default filter" with regard to the filter IF=0 (IF-default). However, a default filter may be a filter other than IF=0. In addition, one or more of the described aspects, embodiments and features may also apply to configurations and embodiments other than those described such as when IF is applicable to MV which are not HALF PEL.

In merge mode, some coding block parameters are not explicitly coded, but are derived from the neighboring reconstructed blocks. For example, in VVC, these coding block parameters may include the motion vectors, reference indexes and IF-index. In merge mode, a list of candidates is built from the spatially neighboring and co-located temporally reconstructed blocks and the index of the candidate to use for a current block is signaled. In VVC and HEVC, a maximum of four merge candidates are selected among candidates located in the positions depicted in FIG. 6. The order of derivation is A0, B0, B1, A1 and B2.

Possibly, one additional co-located temporal candidate may be added to the list (the reference picture list to be used for derivation of the co-located CU can be explicitly signaled in the slice header). Also, an additional history-based motion vector prediction (HMVP) candidate can possibly be added. An additional "pairwise-average" candidate may be generated from two other candidates (C0 and C1) by averaging motion of predefined pairs of candidates (e.g., in VVC, C0 and C1 are named mergeCandList[0], mergeCandList[0]).

In traditional bi-prediction, the prediction sample (biPred [x]) is built by averaging two motion compensated uni-directional prediction samples (refi[x+mvi], i=0, 1) with equal weights (w0=1; w1=1):

biPred[x]=(w0.ref0[x+mv0]+w1.ref1[x+mv1]+1)/2

In case of generalized bi-prediction (e.g., GBI or BPWA or BCW), the weights (w0; w1) are not necessarily equal and are signaled in the bit-stream (or inherited in merge mode).

Other coding parameters must be derived with each merge list candidate, including "pairwise-average" candidate. One of these parameters is the "IF-index". In case of blocks situated in the same image region where the signal characteristics are homogeneous, there exists a strong correlation with the optimal value of IF-index (high probability the value of IF-index giving the best coding trade-off is the same for the blocks of the same region). However, in case of "pairwise-average" candidate, the two candidates C0 and C1 may have different values of "IF-index".

The "pairwise-average" candidate may be generated from two other candidates (C0 and C1) by averaging motion of predefined pairs of candidates. The averaged motion vectors are calculated separately for each reference list (e.g., at 305 in FIG. 19). If both motion vectors are available in one list, these two motion vectors are averaged even when they point to different reference pictures; if only one motion vector is available, use the one directly; if no motion vector is available, the "pairwise-average" has no motion for this reference list (see Table 2 below).

Let's denote IF[PW] the value of IF-index associated with the "pairwise-average" candidate (IF[PW] is denoted hpeIIfIdxavgCand in VVC). In VVC, the derived value of IF[PW] is set to default (0) unless both IF of C0 and C1 are equal and non-default (e.g., at 300 in FIG. 19). If C0 and C1 have different values of IF-index, then IF[PW] is set to default (0), else IF-index[PW] is set to IF-index of C0 (i.e., same IF-index as C1) (see Table 2):

IF[PW]=(IF[C0]==IF[C1]) ? IF[C0]: IF-default

This is expressed in the current draft VVC specification as:

The half sample interpolation filter index hpeIIfIdxavgCand is derived as follows:
  If hpeIIfIdxp0Cand is equal to hpeIIfIdxp1Cand, hpeIIfIdxavgCand is set equal to hpeIIfIdxp0Cand.
  Otherwise, hpeIIfIdxavgCand is set equal to 0.

Let's denote C0={(mv00, idx00);(mv01, idx01)} the two motion vectors and associated reference indexes of C0, and C1={(mv10, idx10);(mv11, idx11)} the two motion vectors and associated reference indexes of C1 if these candidates are bi-prediction candidates. If one motion value is not available, it is noted (-,-).

It may happen that C0 and/or C1 may be uni-directional. For example:
  if C0={(mv00, idx00);(-,-)} then C0 is uni-directional motion vector List-0,
  if C0={(-,-);(mv01, idx01)} then C0 is uni-directional motion vector List-1,
  if C1={(mv10, idx10);(-,-)} then C1 is uni-directional motion vector List-0,
  if C1={(-,-);(mv11, idx11)} then C1 is uni-directional motion vector List-1.

It may happen that C0 and/or C1 may be undefined. For example:

if C0={(-,-);(-,-)} then C0 is undefined,
if C1={(-,-);(-,-)} then C1 is undefined.

Figure 19:
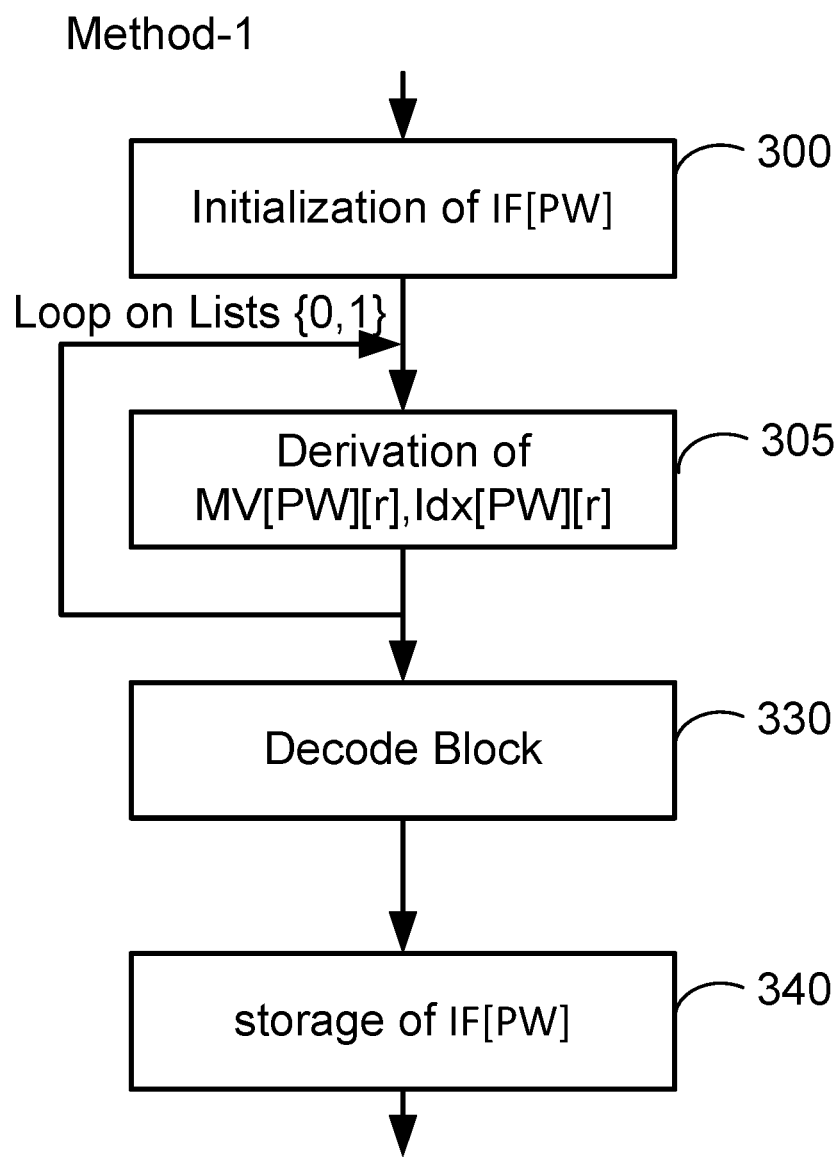
FIG. 19 provides a flow diagram illustrating an example associated with an interpolation filter index.

The derivation of (mv[PW][r], Idx[PW][r]) r=0, 1 and the prediction direction, "interDir", are done at (305) in FIG. 19 and are depicted in Table 2. The value of interDir corresponds to: uni-directional L0 (1), uni-directional L1(2), bi-prediction (3). In VVC, the value "interDir" is mapped with variables "predFlagL0" and "predFlagL1" as follows (Table 1):

TABLE 1

| mapping of "interDir" with (predFlagL0, predFlagL1) | | |
|---|---|---|
| interDir | predFlagL0 | prodFlagL1 |
| 0 | 0 | 0 |
| 1 | 1 | 0 |
| 2 | 0 | 1 |
| 3 | 1 | 1 | as a function of the reference index values, designated "idx", of the candidates C0 and C1 (idx-00, idx-01, idx-10, idx-10). In the following, the values IF[0] or IF[C0] correspond to hpelIfIdxp0Cand and IF[1] or IF[C1] correspond to hpelIfIdxp1Cand. Examples of various embodiments including variants and sub-variants of emb-0 are described below with reference to FIG. 21.

An example of an embodiment based on emb-0 and referred to generally herein as embodiment-1 (or emb-1) involves several variants as follows. In a first variant referred to herein as variant or embodiment 1.1 (or emb-1.1), the initialization at 300 in FIG. 21 is set as follows:

$$IF[PW]=(IF[C0]\|IF[C1])$$

The half sample interpolation filter index hpelIfIdxavgCand is set equal to max(hpelIfIdxp0Cand, hpelIfIdxp1Cand).

Figure 21:
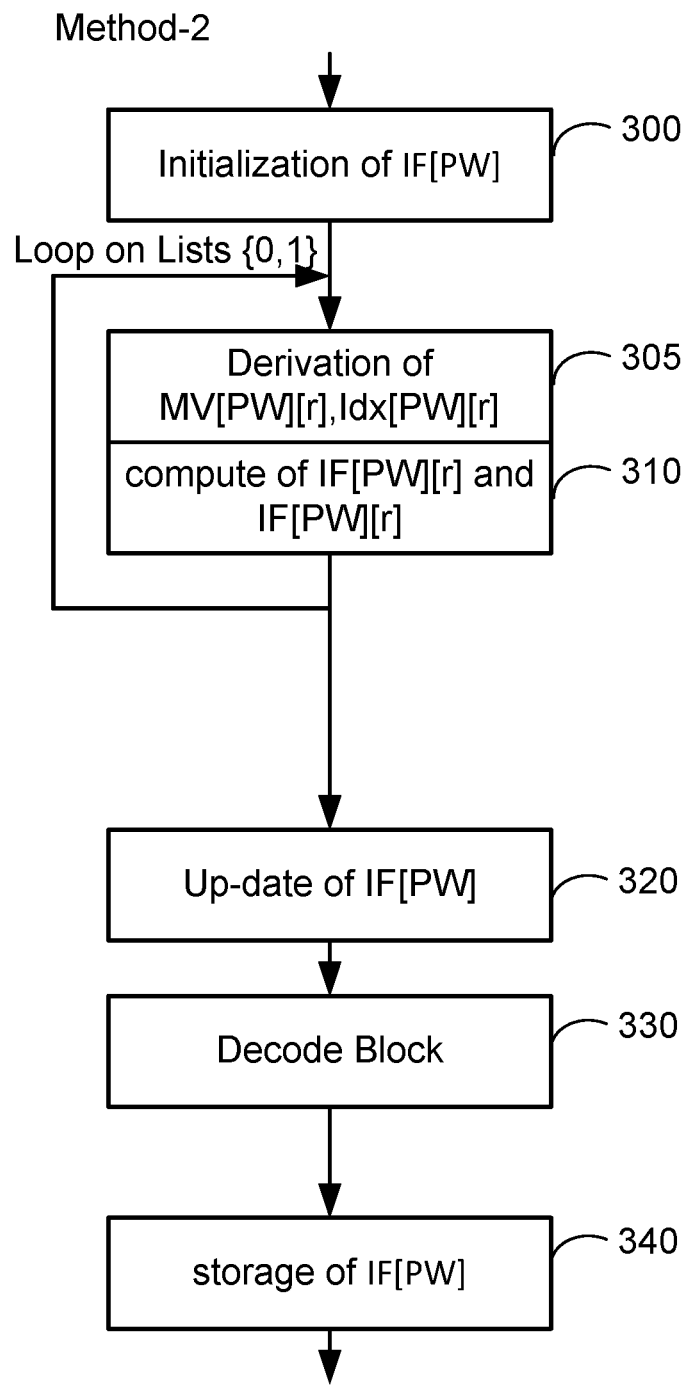
FIG. 21 provides a flow diagram illustrating an example of derivation of an interpolation filter index.

In a second variant referred to herein as variant or embodiment 1.2 (or emb-1.2), the initialization at 300 in FIG. 21 is set as follows:

$$IF[PW]=IF\text{-default}$$

TABLE 2 derivation of MV[PW], Idx[PW] and IF[PW] in VVC ('—' indicates value not available).

| C0 | (mv00,idx00);(mv01,idx01); IF[0] | (mv00,idx00);(—,—); IF[0] | |
|---|---|---|---|
| C1 | (mv10,idx10);(mv11,idx11); IF[1] | (mv10,idx10);(mv11,idx11); IF[1] | |
| (mv[PW][0], Idx[PW]), (mv[PW][1], Idx[PW][1]) | (avg(mv00,mv10),idx00); (mv01+mv11,idx01) | (avg(mv00,mv10),idx00) ; (mv11,idx11) | |
| interDir | 3 | 3 | |
| Initialization of IF[PW] | IF[PW] = (IF[0] == IF[1] ) ? IF[0] : false | | |
| C0 | (—,—);(mv01,idx01); IF[0] | (—,—);(mv01,idx01); IF[0] | (—,—);(mv01,idx01); IF[0] |
| C1 | (mv10,idx10);(—,—); IF[1] | (—,—);(mv11,idx11); IF[1] | (mv10,idx10);(mv11,idx11); IF[1] |
| (mv[PW][0], Idx[PW]), (mv[PW][1], Idx[PW][1]) | (mv10,idx10); (mv01,idx01) | (—,—); (avg(mv01,mv11),idx01) | (mv10,idx10); (avg(mv01,mv11),idx01) |
| interDir | 3 | 2 | 3 |
| Initialization of IF[PW] | IF[PW] = (IF[0] == IF[1] ) ? IF[0] : false | | |
| C0 | (mv00,idx00);(—,—); IF[0] | (mv00,idx00);(—,—); IF[0] | (—,—);(mv01,idx01); IF[0] |
| C1 | (—,—);(mv11,idx11); IF[1] | (mv10,idx10);(—,—); IF[1] | (mv10,idx10);(mv11,idx11); IF[1] |
| (mv[PW][0], Idx[PW]), (mv[PW][1], Idx[PW][1]) | (mv00,idx00); (mv11,idx11) | (avg(mv00+mv10),idx00); (— ;,—); | (mv10,idx10); (mv01+mv11,idx01) |
| interDir | 3 | 1 | 3 |
| Initialization of IF[PW] | IF[PW] = (IF[0] == IF[1] ) ? IF[0] : false | | |

However, in case IF[0] and IF[1] are different, then the value of IF[PW] is zero and that could be sub-optimal.

Figure 20:
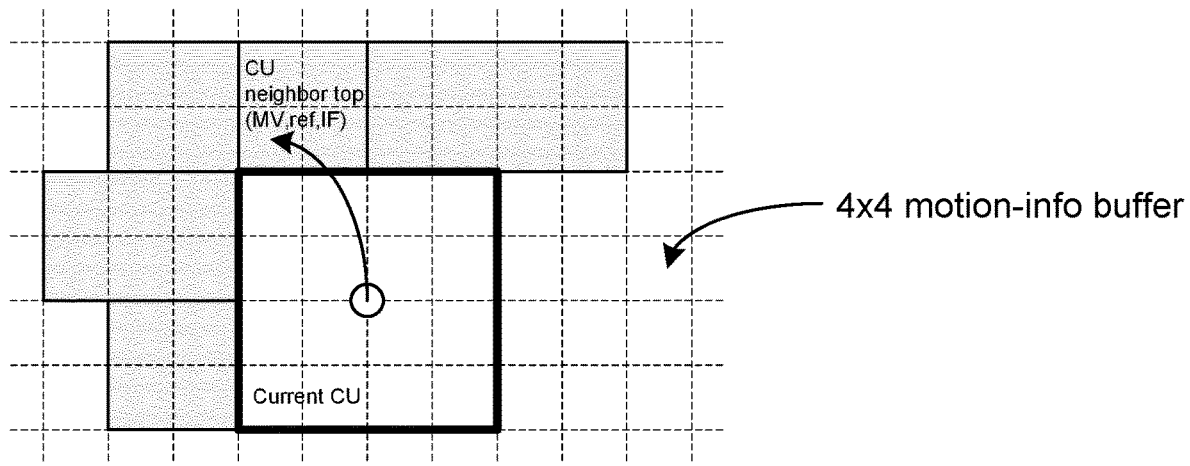
FIG. 20 shows an example of a co-located storage buffer for motion information.

In order for the IF-index value used to reconstruct current block (e.g., at 330 in FIG. 19) to be further used by blocks coded in merge mode, the current value of the IF-index is stored (e.g., at 340 in FIG. 17) in a co-located storage buffer at 4×4 resolution typically (e.g., FIG. 20). To avoid memory storage burden, one single IF-index is stored.

An example of an embodiment, referred to herein as "embodiment 0" or "emb 0", involves deriving the value of IF[PW] for the "pairwise-average" so that IF[PW] can be equal to non-default even if IF[0] or IF[1] is equal to default, or deriving the value of IF[PW] for the "pairwise-average"

In a third variant referred to herein as variant or embodiment 1.3 (or emb-1.3), the initialization at 300 in FIG. 21 is set as follows:

$$IF[PW]=(IF[C0]==IF[C1]) \text{ ? } IF[C0]: IF\text{-default}$$

An example of an embodiment based on emb-0 and referred to generally herein as embodiment-2 (or emb-2) involves the following.

In FIG. 21, (300) (initialization of IF[PW]), (305), (330), (340) are unchanged. Intermediate values IF[PW][0] and IF[PW][1] are computed at (310) and IF[PW] is updated at (320) with IF[PW][0] and IF[PW][1]. For example, (310) can be (r=0 or 1):

if both mv0r and mv1r are available: IF[PW][r]=IF[0]
else if mv0r only is available: IF[PW][r]=IF[0]
else if mv1r only is available: IF[PW][r]=IF[1]
else IF[PW][r]=IF[PW]

For (320), various implementations are possible. Several examples are described below, each forming a variant of emb-2 as follows.

In a first variant referred to herein as variant or embodiment 2.1 (or emb-2.1), the update at (320) in FIG. 9 can be:

IF[PW]|=(IF[PW][0]||IF[PW][1])

In a second variant referred to herein as variant or embodiment 2.2 (or emb-2.2), the update at (320) in FIG. 9 can be:

IF[PW]=(IF[PW][0]==IF[PW][1]) ? IF[PW][0]: IF-default

In a third variant referred to herein as variant or embodiment 2.3 (or emb-2.3):

if both mv0r and mv1r are available: IF[PW]=(IF[PW][0]||IF[PW][1])
else if mv0r only is available: IF[PW]|=IF[0]
else if mv1r only is available: IF[PW]|=IF[1]

In a fourth variant referred to herein as variant or embodiment 2.4 (or emb-2.4):

if both mv0r and mv1r are available: IF[PW]|=IF[0]
else if mv0r only is available: IF[PW]|=IF[0]
else if mv1r only is available: IF[PW]|=IF[1]

Figure 22:
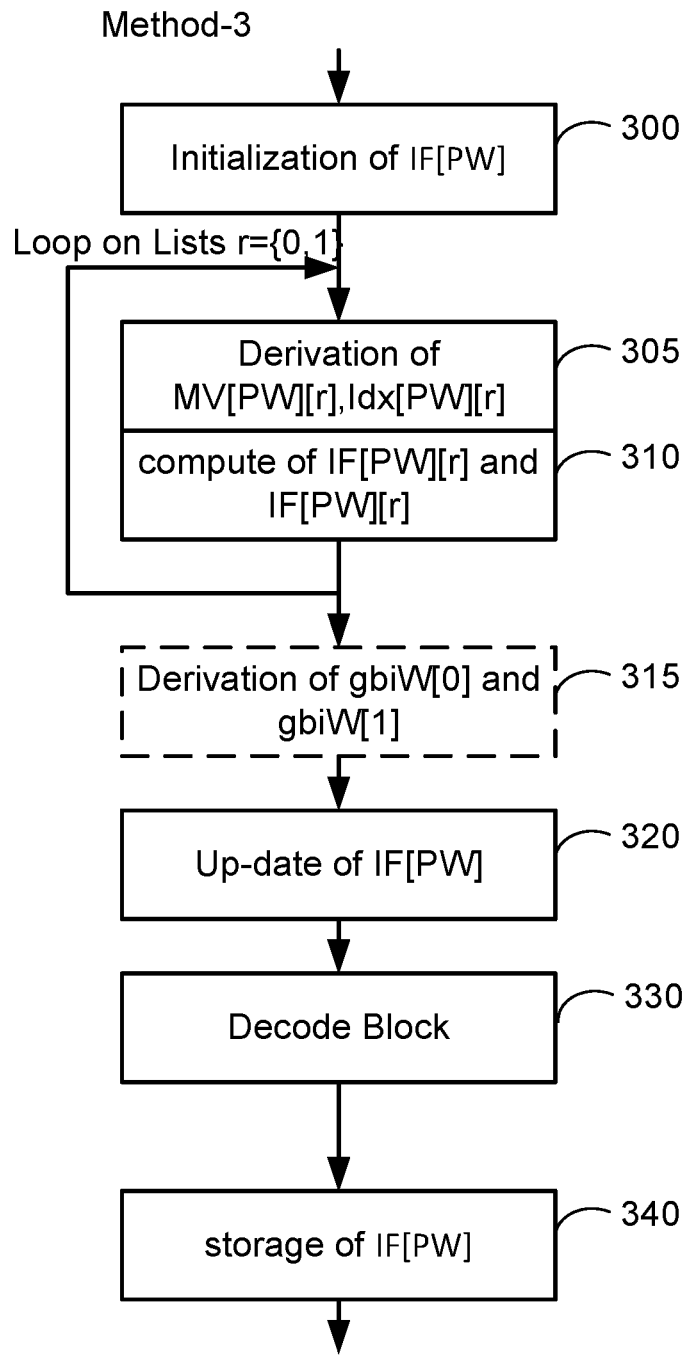
FIG. 22 provides a flow diagram illustrating another example of derivation of an interpolation filter index.

An example of an embodiment based on emb-0 and emb-2 and referred to generally herein as embodiment-3 (or emb-3) is illustrated in FIG. 22 and involves the following. In FIG. 22, (315) is included to enable collecting bi-prediction weights (a.k.a. GBI or BPWA or BCW) associated to C0 (or C1) if C0 (or C1) are bi-prediction candidates, which are further used to derive IF[PW] at (320). In the following, let's denote gbiW[0][r=0] and gbiW[0][r=1] the bi-prediction weights associated with C0, and gbiW[1][r=0] and gbiW[1][r=1] the bi-prediction weights associated with C1. In case C0 (or C1) is uni-directional, gbiW[0][r=0] and gbiW[0][r=1] (or gbiW[1][r=0] and gbiW[1][r=1]) are considered to be equal weights.

In an example of a first variant of emb-3, referred to herein as variant or embodiment 3.1 (or emb-3.1), at (315), the values gbiW[PW][r], r=0, 1, are derived as follows:

if both mv0r and mv1r are available:

```
gbiW[PW][r] = max( abs( gbiW[0][r] ) ; abs( gbiW[1][r] ) )
    if ( abs( gbiW[0][r] ) > abs( gbiW[1][r] ) )        IF[PW][r] = IF[0]
    else if ( abs( gbiW[0][r] ) < abs( gbiW[1][r] ) )   IF[PW][r] = IF[1]
    else                                                IF[PW][r] = ( IF[0] || IF[1] )
else if mv0r only is available:  gbiW[PW][r] = abs( gbiW[0][r] ) and IF[PW][r] = IF[0]
else if mv1r only is available:  gbiW[PW][r] = abs( gbiW[1][r] ) and IF[PW][r] = IF[1]
else                             gbiW[PW][r] = 0 and IF[PW][r] = default
```

In variant 3.1, (320) is modified as follows:

```
if ( gbiW[PW][0] > gbiW[PW][1] ):       IF[PW] = IF[PW][0]
else if ( gbiW[PW][0] < gbiW[PW][1] ):  IF[PW] = IF[PW][1]
else:                                   IF[PW] = (IF[PW][0] == IF [PW][1]) ? IF[PW][0] : IF-default
```

In an example of a second variant of emb-3, referred to herein as variant or embodiment 3.2 (or emb-3.2), (320) is modified as follows:

```
if ( gbiW[PW][0] > gbiW[PW][1] ):       IF[PW] = IF[PW][0]
else if ( gbiW[PW][0] < gbiW[PW][1] ):  IF[PW] = IF[PW][1]
else:                                   IF[PW] = (IF[PW][0] == IF[PW][1]) ? IF[PW][0] : IF-default
```

An example of a third variant of emb-3, referred to herein as variant or embodiment 3.3 (or emb-3.3), involves the following:

```
if( gbiW[PW][0] > gbiW[PW][1] ):        IF[PW] = IF[PW][0]
else if ( gbiW[PW][0] < gbiW[PW][1] ):  IF[PW] = IF[PW][1]
else:                                   IF[PW] = ( IF[PW][0] || IF[PW][1] )
```

An example of a fourth variant of emb-3, referred to herein as variant or embodiment 3.4 (or emb-3.4), involves the following:

$$IF[PW]|=(IF[PW][0]||IF[PW][1])$$

An example of an embodiment referred to generally herein as embodiment-4 (or emb-4) i involves the following. In case the "pairwise-average" candidate is bi-prediction, the value of IF-index used for the motion compensation of L0 (or L1) is IF[PW][0] (or IF[PW][1] respectively). The value stored (340) is IF[PW] computed as in emb-1, emb-2 or emb-3.

Examples of various embodiments of syntax for implementing the examples of embodiments and variants described herein are illustrated below based on a current version of the specification of VVC (Draft 6) wherein insertions are indicated by bolded and italicized text (e.g. insertion) and deletions are indicated by text lined through (e.g., deletion).

With regard to embodiments 0, 1 and 2 (emb-0, emb-1, emb-2) and associated variants, examples of modifications to paragraphs in a current version of the VVC specification are provided below. The values IF[0], IF[1] correspond to hpelIfIdxp0Cand and hpelIfIdxp1Cand. The candidate avgCand is added at the end of mergeCandList, i.e., mergeCandList[numCurrMergeCand] is set equal to avgCand, and the reference indices, the prediction list utilization flags and the motion vectors of avgCand are derived as follows and numCurrMergeCand is incremented by 1.

For the example of embodiment 1, variant 1.1 (i.e., emb-1.1), at (300) in FIG. 9 or 10:
- *The half sample interpolation filter index hpelIfIdxavgCand is initialized as max( hpelIfIdxp0Cand , hpelIfIdxp1Cand ).*

For the example of embodiment 1, variant 1.3 (i.e., emb-1.3), at (300) in FIG. 9 or 10:
- *The half sample interpolation filter index hpelIfIdxavgCand is initialized as follows:*
  - *If hpelIfIdxp0Cand is equal to hpelIfIdxp1Cand, hpelIfIdxavgCand is set equal to hpelIfIdxp0Cand.*
  - *Otherwise, hpelIfIdxavg Cand is set equal to 0.*

For each reference picture list LX with X ranging from 0 to (numRefLists−1), the following applies:
  If predFlagLXp0Cand is equal to 1 and predFlagLXp1Cand is equal to 1, the variables refIdxLXavgCand, predFlagLXavgCand, mvLXavgCand[0], and mvLXavgCand[1] are derived as follows:

refIdxLXavgCand=refIdxLXp0Cand   (8-347)

predFlagLXavgCand=1   (8-348)

For the example of embodiment 2, variant 2.1 (i.e., emb-2.1):
*hpelIfIdxavgCand = max(*
  *hpelIfIdx0Cand, hpelIfIdxp1Cand)*

For the example of embodiment 2, variant 2.4 (i.e., emb-2.4):
*hpelIfIdxavgCand = max(*
  *hpelIfIdxavgCand, hpelIfIdxp0Cand)*

The rounding process for motion vectors as specified in clause 8.5.2.14 is invoked with mvX set equal to mvLXp0Cand[0]+mvLXp1Cand[0], rightShift set equal to 1, and leftShift set equal to 0 as inputs and the rounded mvLXavgCand[0] as output.

The rounding process for motion vectors as specified in clause 8.5.2.14 is invoked with mvX set equal to mvLXp0Cand[1]+mvLXp1Cand[1], rightShift set equal to 1, and leftShift set equal to 0 as inputs and the rounded mvLXavgCand[1] as output.

Otherwise, if predFlagLXp0Cand is equal to 1 and predFlagLXp1Cand is equal to 0, the variables refIdxLXavgCand, predFlagLXavgCand, mvLXavgCand[0], mvLXavgCand[1] are derived as follows:

refIdxLXavgCand=refIdxLXp0Cand   (8-349)

predFlagLXavgCand=1   (8-350)

mv*LX*avgCand[0]=mv*LXp*0Cand[0]   (8-351)

mv*LX*avgCand[1]=mv*LXp*0Cand[1]   (8-352)

For the example of embodiment 2, variant 2.1 (i.e., emb-2.1):
*hpelIfIdxavgCand = max(*
  *hpelIfIdx0Cand, hpelIfIdxp0Cand)*

Otherwise, if predFlagLXp0Cand is equal to 0 and predFlagLXp1Cand is equal to 1, the variables refIdxLXavgCand, predFlagLXavgCand, mvLXavgCand[0], mvLXavgCand[1] are derived as follows:

refIdxLXavgCand=refIdxLXp1Cand   (8-353)

predFlagLXavgCand=1   (8-354)

mv*LX*avgCand[0]=mv*LXp*1Cand[0]   (8-355)

mv*LX*avgCand[1]=mv*LXp*1Cand[1]   (8-356)

For the example of embodiment 2, variant 2.1 (i.e., emb-2.1):
*hpelIfIdxavgCand = max(*
  *hpelIfIdxavgCand, hpelIfIdxp1Cand)*

Otherwise, if predFlagLXp0Cand is equal to 0 and predFlagLXp1Cand is equal to 0, the variables refIdxLXavgCand, predFlagLXavgCand, mvLXavgCand[0], mvLXavgCand[1] are derived as follows:

refIdx*LX*avgCand=−1   (8-357)

predFlagLXavgCand=0   (8-358)

mv*LX*avgCand[0]=0   (8-359)

mv*LX*avgCand[1]=0   (8-360)

When numRefLists is equal to 1, the following applies:

refIdxL1avgCand=−1   (8-361)

predFlagL1avgCand=0   (8-362)

For the examples of embodiments 0, 3 and 4 (emb-0, emb-3, emb-4):
In the following:
  The values "IF[PW][r], r=0, 1" correspond to hpelIfIdxavgCandX, X=0, 1;
  The values gbiW[0][r=0, 1] correspond to bcwW0X, X=0, 1;
  The values gbiW[1][r=0, 1] correspond to bcwW1X, X=0, 1;

The values gbiW[PW][r=0, 1] correspond to bcwWavgX, X=0, 1;

The value IF[PW] correspond to hpelIfIdxavgCand.

The candidate avgCand is added at the end of mergeCandList, i.e., mergeCandList[numCurrMergeCand] is set equal to avgCand, and the reference indices, the prediction list utilization flags and the motion vectors of avgCand are derived as follows and numCurrMergeCand is incremented by 1:

For each reference picture list LX with X ranging from 0 to (numRefLists−1), the following applies:

For the example of embodiment 3, variant 3.1 (i.e., emb-3.1):

If predFlagLXp0Cand is equal to 1 and predFlagLXp1Cand is equal to 1, the variables hpelIfIdxavgCandX, bcwW0X, bcwW1X, bcwWavgX, refIdxLXavgCand, predFlagLXavgCand, mvLXavgCand[0], and mvLXavgCand[1] are derived as follows:

--- refIdxLXavgCand = refIdxLXp0Cand (8-347)
predFlagLXavgCand = 1 (8-348)
bcwW0X = abs( (X==1) ? bcwWLut[ bcwIdx0 ] : (8 − bcwWLut[ bcwIdx0 ]) ) (at (315))
bcwW1X = abs( (X==1) ? bcwWLut[ bcwIdx1 ] : (8 − bcwWLut[ bcwIdx1 ]) )
bcwWavgX = max( bcwW0X, bcwW1X )
if ( bcwW0X > bcwW1X )
    hpelIfIdxavgCandX = hpelIfIdxp0Cand
else if ( bcwW1X > bcwW0X )
    hpelIfIdxavgCandX = hpelIfIdxp1Cand
else
    hpelIfIdxavgCandX = max( hpelIfIdxp0Cand, hpelIfIdxp1Cand )

---

The rounding process for motion vectors as specified in clause 8.5.2.14 is invoked with mvX set equal to mvLXp0Cand[0]+mvLXp1Cand[0], rightShift set equal to 1, and leftShift set equal to 0 as inputs and the rounded mvLXavgCand[0] as output.

The rounding process for motion vectors as specified in clause 8.5.2.14 is invoked with mvX set equal to mvLXp0Cand[1]+mvLXp1Cand[1], rightShift set equal to 1, and leftShift set equal to 0 as inputs and the rounded mvLXavgCand[1] as output.

Otherwise, if predFlagLXp0Cand is equal to 1 and predFlagLXp1Cand is equal to 0, the variables hpelIfIdxavgCandX, bcwWavgX, refIdxLXavgCand, predFlagLXavgCand, mvLXavgCand[0], mvLXavgCand[1] are derived as follows:

refIdxLXavgCand=refIdxLXp0Cand (8-349)

predFlagLXavgCand=1 (8-350)

bcwWavX = abs((I==1) ? bcwWLut[bcwIdx0] : (8−bcwWLut[bcwIdx0])) (at (315))
hpelIfIdxavgCandX − hpelIfIdxp0Cand mvLXavgCand[0]=mvLXp0Cand[0] (8-351)

mvLXavgCand[1]=mvLXp0Cand[1] (8-352)

Otherwise, if predFlagLXp0Cand is equal to 0 and predFlagLXp1Cand is equal to 1, the variables hpelIfIdxavgCandX, bcwWavgX, refIdxLXavgCand, predFlagLXavgCand, mvLXavgCand[0], mvLXavgCand[1] are derived as follows:

refIdxLXavgCand=refIdxLXp1Cand (8-353)

predFlagLXavgCand=1 (8-354)

bcwWavgX = abs((X==1) ? bcwWLut[bcwIdx1] : (8−bcwWLut[bcwIdx1])) (at (315))
hpelIfIdxavgCandX = hpelIfIdxp1Cand mvLXavgCand[0]=mvLXp1Cand[0] (8-355)

mvLXavgCand[1]=mvLXp1Cand[1] (8-356)

Otherwise, if predFlagLXp0Cand is equal to 0 and predFlagLXp1Cand is equal to 0, the variables hpelIfIdxavgCandX, bcwWavgX, refIdxLXavgCand, predFlagLXavgCand, mvLXavgCand[0], mvLXavgCand[1] are derived as follows:

refIdxLXavgCand=−1 (8-357)

predFlagLXavgCand=0 (8-358)

bcwWavgX= (at (315))
hpelIfIdxavgCandX = 0 mvLXavgCand[0]=0 (8-359)

mvLXavgCand[1]=0 (8-360)

When numRefLists is equal to 1, the following applies:

refIdxL1avgCand=−1 (8-361)

predFlagL1avgCand=0 (8-362)

The half sample interpolation filter index hpelIfIdxavgCand is derived as follows:

For the example of embodiment 3, variant 3.1 (i.e., emb-3.1):

--- if ( bcwWavg0 > bcwWavg1 )
    hpelIfIdxavgCand = hpelIfIdxavgCand0
else if ( bcwWavg1 > bcwWavg0 )
    hpelIfIdxavgCand = hpelIfIdxavgCand1
else
    hpelIfIdxavgCand = ( hpelIfIdxavgCand0== hpelIfIdxavgCand1 ) ? hpelIfIdxavgCand0 : 0

---

A variety of examples of embodiments, including tools, features, models, approaches, etc., are described herein and include, but are not limited to:

deriving an interpolation-filter index in the case of a pairwise merge candidate;

deriving a value of an interpolation-filter index for a "pairwise-average" candidate, i.e., IF[PW], so that IF[PW] can be equal to a non-default value even if the interpolation-filter index for a candidate 0 (i.e., designated either IF[C0] or IF[0]) or the interpolation-filter index for candidate 1 (i.e., designated either IF[C1] or IF[1]) is equal to the default value;

deriving a value of IF[PW] as a function of the reference index values (i.e., designated "idx") of the candidates C0 and C1 (idx-00, idx-01, idx-10, idx-10);

deriving a value of IF[PW] wherein the deriving includes an initialization of IF[PW] to a maximum of IF[0], IF[1];

deriving a value of IF[PW] wherein the deriving includes an initialization of IF[PW] to a default value;

deriving a value of IF[PW] wherein the deriving includes an initialization of IF[PW] to the value of IF[0] if IF[0] equals IF[1], else IF[PW] is initialized to a default value;

deriving a value of IF[PW] wherein the deriving includes an initialization of IF[PW] to one of:
 the maximum of IF[0], IF[1]; or
 a default value; or
 the value of IF[0] if IF[0] equals IF[1], else IF[PW] is initialized to a default value;

deriving a value of IF[PW] wherein the deriving includes:
 initialization of IF[PW] according to any method described above; and
 determining intermediate values IF[PW][r], r=0, 1, based on availability of motion vectors mv0r and mv1r, wherein
  if both mv0r and mv1r are available: IF[PW][r]=IF[0]
  else if mv0r only is available: IF[PW][r]=IF[0]
  else if mv1r only is available: IF[PW][r]=IF[1]
  else IF[PW][r]=IF[PW]
 updating IF[PW] based on IF[PW][r];

deriving a value of IF[PW] as described above, wherein updating IF[PW] based on IF[PW][r] comprises setting IF[PW] to the maximum of IF[PW][0] and IF[PW][1];

deriving a value of IF[PW] as described above, wherein updating IF[PW] based on IF[PW][r] comprises setting IF[PW] to IF[PW][0] if IF[PW][0] equals IF[PW][1], else setting IF[PW] to a default value;

deriving a value of IF[PW] as described above, wherein updating IF[PW] based on IF[PW][r] comprises setting IF[PW] based on availability of motion vectors mv0r and mv1r such that:
 if both mv0r and mv1r are available: IF[PW]=(IF[PW][0]||IF[PW][1])
 else if mv0r only is available: IF[PW]|=IF[0]
 else if mv1r only is available: IF[PW]|=IF[1]

deriving a value of IF[PW] as described above, wherein updating IF[PW] based on IF[PW][r] comprises setting IF[PW] based on availability of motion vectors mv0r and mv1r such that:
 if both mv0r and mv1r are available: IF[PW]|=IF[0]
 else if mv0r only is available: IF[PW]|=IF[0]
 else if mv1r only is available: IF[PW]|=IF[1]

deriving a value of IF[PW] as described above, wherein determining intermediate values IF[PW][r] is followed by
 determining bi-prediction weights associated to candidate 0, e.g., gbiW[0][r], r=0, 1, if candidate 0 is a bi-prediction candidate and/or determining bi-prediction candidates associated to candidate 1, e.g., gbiW[0][r], r=0, 1, if candidate 1 is a bi-prediction candidate; and
 updating IF[PW] is further based on the bi-prediction weights, wherein determining the bi-prediction weights and updating IF[PW] based on the bi-prediction weights are based on availability of motion vectors mv0r and mv1r in accordance with embodiment emb-3.1 as described herein;

deriving a value of IF[PW] as described above based on bi-prediction weights, wherein updating IF[PW] is based on embodiment emb-3.2 as described herein;

deriving a value of IF[PW] as described above based on bi-prediction weights, wherein updating IF[PW] is based on embodiment emb-3.3 as described herein;

deriving a value of IF[PW] as described above based on bi-prediction weights, wherein updating IF[PW] comprises setting IF[PW] to the maximum of IF[PW][0] or IF[PW][1];

deriving a value of IF[PW] as described above based on bi-prediction weights, wherein
 a value of IF-index used for the motion compensation of L0 (or L1) is IF[PW][0] (or IF[PW][1] respectively), and wherein
 the deriving further comprises storing a value of IF[PW] determined in accordance with any of the embodiments described herein;

providing video encoding and/or decoding in accordance with any embodiment described herein in the form of a method, apparatus, device, computer program product, bitstream, or any of the foregoing incorporating syntax for implementing any embodiment described herein.

Figure 23:
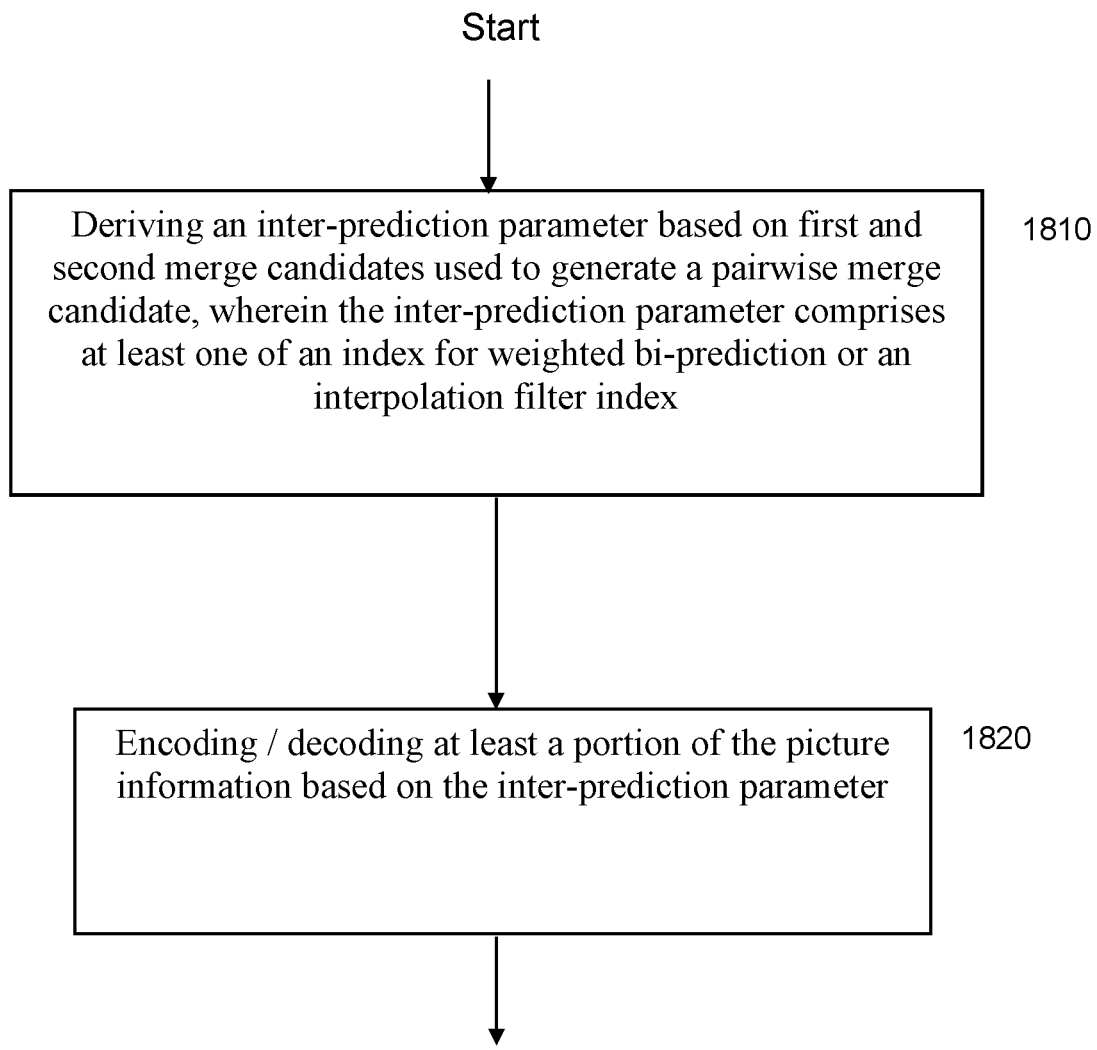
FIG. 23 provides a flow diagram illustrating an example of an embodiment in accordance with the present disclosure.

Another example of an embodiment in accordance with the preceding description is illustrated in FIG. 23. In FIG. 23, 1810 provides for deriving an inter-prediction parameter. Deriving the inter-prediction parameter is based on first and second merge candidates used to generate a pairwise merge candidate. The inter-prediction parameter can comprise at least one of an index for weighted prediction or an interpolation filter index. For example, the inter-prediction parameter can be a parameter other than motion vector information and other than a reference picture index. An index for weighted bi-prediction, also referred to as an index for bi-prediction with weights, can be, for example, a GBi index as described herein. An interpolation filter index can be, for example, an index such as IF[PW] as described herein. Then, at 1820, at least a portion of picture information is encoded or decoded based on the inter-predication parameter.

This document describes various examples of embodiments, features, models, approaches, etc. Many of these examples are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the embodiments, features, etc. can be combined and interchanged with others described in earlier filings as well.

Figure 24:
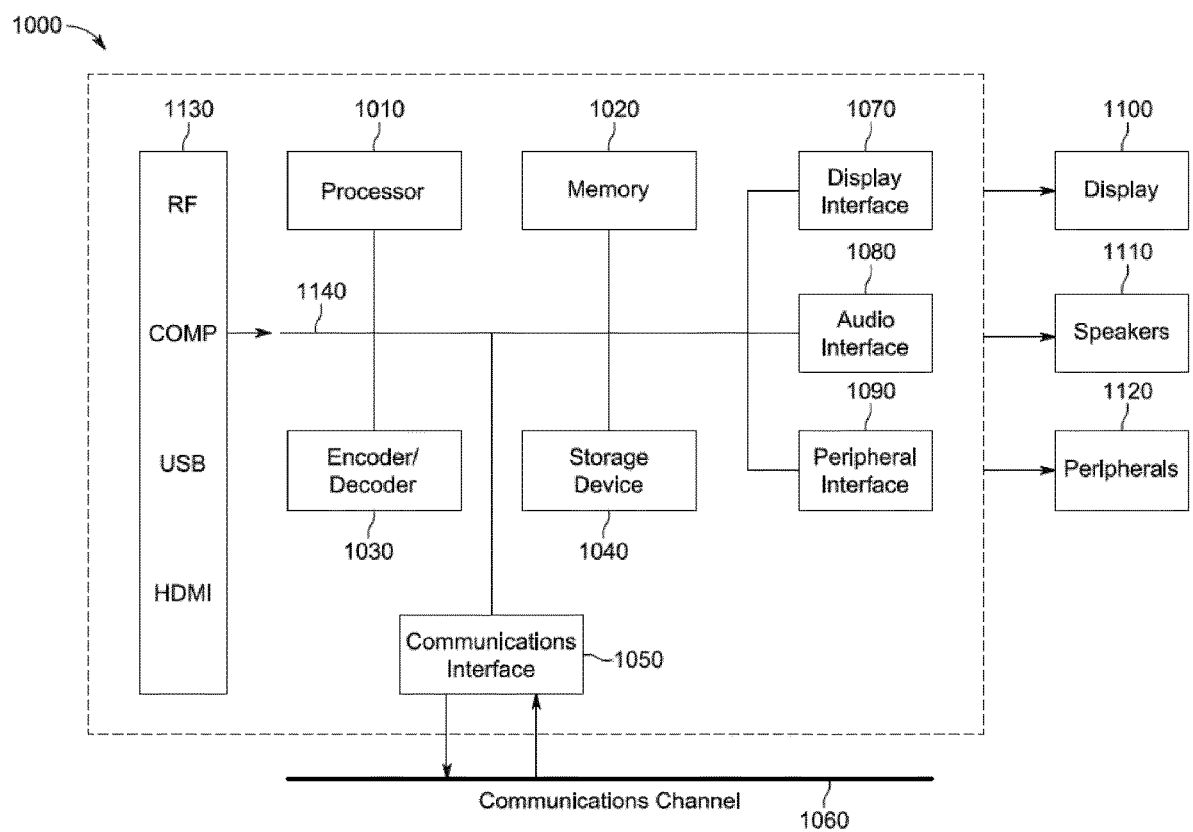
FIG. 24 provides a block diagram illustrating an example of an embodiment of apparatus in accordance with various aspects described herein.

In general, the examples of embodiments described and contemplated herein can be implemented in many different forms. FIGS. 1, 2 and 24 provide some examples of embodiments, but other embodiments are contemplated and the discussion of FIGS. 1, 2 and 24 does not limit the breadth of the implementations. At least one aspect of one or more examples of embodiments described herein generally relates to video encoding and decoding, and at least one other aspect generally relates to transmitting a bitstream generated or encoded. These and other aspects can be implemented in various embodiments such as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, e.g., modules 102 and 170 included in the example of a video encoder embodiment 100 illustrated in FIG. 1 and modules 230 and 275 included in the example of a video decoder embodiment 200 illustrated in FIG. 2. Moreover, the various embodiments, features, etc. described herein are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the size of maximum quantization matrix, the number of block sizes considered. The specific values are for example purposes and the aspects described are not limited to these specific values.

FIG. 24 illustrates a block diagram of an example of a system in which various features and embodiments are implemented. System 1000 can be embodied as a device including the various components described below and is configured to perform or implement one or more of the examples of embodiments, features, etc. described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In general, the system 1000 is configured to implement one or more of the examples of embodiments, features, etc. described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030, e.g., to perform or implement one or more examples of embodiments, features, etc., described in this document, can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 24, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various generalized as well as particularized embodiments are also supported and contemplated throughout this disclosure. Examples of embodiments in accordance with the present disclosure include but are not limited to the following.

At least one example of an embodiment described herein involves a method for encoding picture information, comprising: deriving an inter-prediction parameter based on first and second merge candidates used to generate a pairwise merge candidate, wherein the inter-prediction parameter comprises at least one of an index for weighted bi-prediction or an interpolation filter index; and encoding at least a portion of the picture information based on the inter-prediction parameter.

At least one example of an embodiment described herein involves a method for decoding picture information, comprising: deriving an inter-prediction parameter based on first and second merge candidates used to generate a pairwise merge candidate, wherein the inter-prediction parameter comprises at least one of an index for weighted bi-prediction or an interpolation filter index; and decoding at least a portion of the picture information based on the inter-prediction parameter.

At least one example of an embodiment described herein involves apparatus for encoding picture information, comprising: one or more processors configured to derive an inter-prediction parameter based on first and second merge candidates used to generate a pairwise merge candidate, wherein the inter-prediction parameter comprises at least one of an index for weighted bi-prediction or an interpolation filter index; and encode at least a portion of the picture information based on the inter-prediction parameter.

At least one example of an embodiment described herein involves apparatus for decoding picture information, comprising: one or more processors configured to derive an inter-prediction parameter based on first and second merge candidates used to generate a pairwise merge candidate, wherein the inter-prediction parameter comprises at least one of an index for weighted bi-prediction or an interpolation filter index; and decode at least a portion of the picture information based on the inter-prediction parameter.

At least one example of an embodiment described herein involves a method for encoding picture information, comprising: deriving an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and encoding at least a portion of the picture information based on the inter-prediction parameter.

At least one example of an embodiment described herein involves a method for decoding picture information, comprising: deriving an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and decoding at least a portion of the picture information based on the inter-prediction parameter.

At least one example of an embodiment described herein involves apparatus for encoding picture information, comprising: one or more processors configured to derive an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and encode at least a portion of the picture information based on the inter-prediction parameter.

At least one example of an embodiment described herein involves apparatus for decoding picture information, comprising: one or more processors configured to derive an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and decode at least a portion of the picture information based on the inter-prediction parameter.

At least one example of an embodiment described herein involves a method or apparatus, wherein the index for weighted bi-prediction comprises a bi-prediction index associated with a bi-prediction weight, the first and second merge candidates have the same bi-prediction index, and the pairwise merge candidate has the bi-prediction weight.

At least one example of an embodiment described herein involves a method or apparatus, wherein the index for weighted bi-prediction comprises a bi-prediction index associated with a bi-prediction weight, only one of the first and second merge candidates is a bi-directional candidate and a default value of the bi-prediction index is assigned to the pairwise merge candidate.

At least one example of an embodiment described herein involves a method or apparatus, wherein the index for weighted bi-prediction comprises a bi-prediction index associated with a bi-prediction weight, only one of the first and second merge candidates is a bi-directional candidate and a value of the bi-prediction index associated with the bi-directional candidate is assigned to the pairwise merge candidate.

At least one example of an embodiment described herein involves a method, wherein the index for weighted bi-prediction comprises a bi-prediction index associated with a bi-prediction weight, the first and second merge candidates are a uni-directional type associated with respective first and second reference picture list, and deriving the inter-prediction parameter comprises generating a combined bi-directional merge candidate based on the first and second uni-directional merge candidates and assigning a default bi-prediction weight to the combined bi-directional merge candidate.

At least one example of an embodiment described herein involves apparatus, wherein the index for weighted bi-prediction comprises a bi-prediction index associated with a bi-prediction weight, the first and second merge candidates are a uni-directional type associated with respective first and second reference picture list, and the one or more processors being configured to derive the inter-prediction parameter comprises the one or more processors being configured to generate a combined bi-directional merge candidate based on the first and second uni-directional merge candidates and assign a default bi-prediction weight to the combined bi-directional merge candidate.

At least one example of an embodiment described herein involves a method or apparatus, wherein the index for weighted bi-prediction comprises a bi-prediction index associated with a bi-prediction weight assigned to the combined pairwise merge candidate, such that a higher weight value is associated to an inter-prediction direction in which the combined bi-directional merge candidate points to a reference picture having a temporal distance closer to the current picture.

At least one example of an embodiment described herein involves a method or apparatus, wherein the index for weighted bi-prediction comprises a bi-prediction index associated with a bi-prediction weight, the first and second merge candidates are of a bi-directional type with respective first and second different bi-prediction weights, and an average of the first and second weights is assigned to the pairwise merge candidate.

At least one example of an embodiment described herein involves a method or apparatus, wherein the average of the first and second weights is rounded to either a closest value of an equal weight or away from the equal weight.

At least one example of an embodiment described herein involves a method, wherein the index for weighted bi-prediction comprises a bi-prediction index associated with a bi-prediction weight, the first and second merge candidates are of a bi-directional type having respective first and second weights, and further comprising determining the pairwise merge candidate only if the first and second weights are equal.

At least one example of an embodiment described herein involves apparatus, wherein the index for weighted bi-prediction comprises a bi-prediction index associated with a bi-prediction weight, the first and second merge candidates are of a bi-directional type having respective first and second weights, and further comprising the one or more processors being configured to determine the pairwise merge candidate only if the first and second weights are equal.

At least one example of an embodiment described herein involves a method, wherein deriving the inter-prediction parameter comprises searching among a plurality of merge candidates for the first and second merge candidates comprising a unidirectional merge candidate and a bi-directional merge candidate or two bi-directional merge candidates with equal weights.

At least one example of an embodiment described herein involves apparatus, wherein the one or more processors being configured to derive the inter-prediction parameter comprises the one or more processors being further configured to search among a plurality of merge candidates for the first and second merge candidates comprising a unidirectional merge candidate and a bi-directional merge candidate or two bi-directional merge candidates with equal weights.

At least one example of an embodiment described herein involves a method or apparatus, wherein the bi-prediction weight comprises a generalized bi-prediction (GBi) weight or a bi-prediction with weight average (BPWA) weight or a bi-prediction with CU weight (BiCW).

At least one example of an embodiment described herein involves a method, wherein the inter-prediction parameter comprises the interpolation filter index and deriving the inter-prediction parameter comprises initializing the interpolation filter index to one of: a maximum of a first interpolation filter index associated with the first merge candidate and a second interpolation filter index associated with the second merge candidate, or a default interpolation filter index, or the first interpolation filter index if the first and second interpolation filter indices are equal, otherwise to the default interpolation filter index.

At least one example of an embodiment described herein involves apparatus, wherein the inter-prediction parameter comprises the interpolation filter index and the one or more processors being configured to derive the inter-prediction parameter comprises the one or more processors being configured to initialize the interpolation filter index to one of: a maximum of a first interpolation filter index associated with the first merge candidate and a second interpolation filter index associated with the second merge candidate, or a default interpolation filter index, or the first interpolation filter index if the first and second interpolation filter indices are equal, otherwise to the default interpolation filter index.

At least one example of an embodiment described herein involves a method, wherein the inter-prediction parameter comprises the interpolation filter index and deriving the inter-prediction parameter comprises determining respective first and second intermediate values of a first interpolation filter index associated with the first merge candidate and a second interpolation filter index associated with the second merge candidate based on a first availability of first and second motion vectors associated with the first merge candidate and third and fourth motion vectors associated with the second merge candidate, and updating the interpolation filter index based on the first and second intermediate values to one of: a maximum of the first and second intermediate values, or the first intermediate value if the first and second intermediate values are equal, otherwise to the default interpolation filter index, or a value based on a second availability of the first, second, third and fourth motion vectors.

At least one example of an embodiment described herein involves a method, wherein determining the first and second intermediate values based on the first availability comprises if the first, second, third and fourth motion vectors are available then the first and second intermediate values are equal to the interpolation filter index associated with the first merge candidate, or if only the first and second motion vectors are available then the first and second intermediate values are equal to the interpolation filter index associated with the first merge candidate, or if only the third and fourth motion vectors are available then the first and second intermediate values are equal to the interpolation filter index associated with the second merge candidate, or else the first and second intermediate values are equal to an interpolation index associated with the pairwise merge candidate.

At least one example of an embodiment described herein involves a method, wherein updating the interpolation filter index based on the first and second intermediate values to a value based on the second availability of the first, second, third and fourth motion vectors comprises updating the interpolation filter index to a maximum of the first and second intermediate values if the first, second, third and fourth motion vectors are available, or updating the interpolation filter index to the interpolation filter index associated with the first merge candidate if only the first and second motion vectors are available, or updating the interpolation filter index to the interpolation filter index associated with the second merge candidate if only the third and fourth motion vectors are available.

At least one example of an embodiment described herein involves a method, wherein updating the interpolation filter index based on the first and second intermediate values to a value based on the second availability of the first, second, third and fourth motion vectors comprises updating the interpolation filter index to the interpolation filter index associated with the first merge candidate if the first, second, third and fourth motion vectors are available, or updating the interpolation filter index to the interpolation filter index associated with the first merge candidate if only the first and second motion vectors are available, or updating the interpolation filter index to the interpolation index associated with the second merge candidate if only the third and fourth motion vectors are available.

At least one example of an embodiment described herein involves apparatus, wherein the inter-prediction parameter comprises the interpolation filter index and the one or more processors being configured to derive the inter-prediction parameter comprises the one or more processors being configured to determine respective first and second intermediate values of a first interpolation filter index associated with the first merge candidate and a second interpolation filter index associated with the second merge candidate based on a first availability of first and second motion vectors associated with the first merge candidate and third and fourth motion vectors associated with the second merge candidate, and update the interpolation filter index based on the first and second intermediate values to one of: a maximum of the first and second intermediate values, or the first intermediate value if the first and second intermediate values are equal, otherwise to the default interpolation filter index, or a value based on a second availability of the first, second, third and fourth motion vectors.

At least one example of an embodiment described herein involves apparatus, wherein the one or more processors being configured to determine the first and second intermediate values based on the first availability comprises if the first, second, third and fourth motion vectors are available then the first and second intermediate values are equal to the interpolation filter index associated with the first merge candidate, or if only the first and second motion vectors are available then the first and second intermediate values are equal to the interpolation filter index associated with the first merge candidate, or if only the third and fourth motion vectors are available then the first and second intermediate values are equal to the interpolation filter index associated with the second merge candidate, or else the first and second intermediate values are equal to an interpolation index associated with the pairwise merge candidate.

At least one example of an embodiment described herein involves apparatus, wherein the one or more processors being configured to update the interpolation filter index based on the first and second intermediate values to a value based on the second availability of the first, second, third and fourth motion vectors comprises the one or more processors being configured to update the interpolation filter index to a maximum of the first and second intermediate values if the first, second, third and fourth motion vectors are available, or update the interpolation filter index to the interpolation filter index associated with the first merge candidate if only the first and second motion vectors are available, or update the interpolation filter index to the interpolation filter index associated with the second merge candidate if only the third and fourth motion vectors are available.

At least one example of an embodiment described herein involves apparatus, wherein the one or more processors being configured to update the interpolation filter index based on the first and second intermediate values to a value based on the second availability of the first, second, third and fourth motion vectors comprises the one or more processors being configured to update the interpolation filter index to the interpolation filter index associated with the first merge candidate if the first, second, third and fourth motion vectors are available, or update the interpolation filter index to the interpolation filter index associated with the first merge candidate if only the first and second motion vectors are available, or update the interpolation filter index to the interpolation index associated with the second merge candidate if only the third and fourth motion vectors are available.

At least one example of an embodiment described herein involves a method, wherein the updating of the interpolation filter index is preceded by determining bi-prediction weights associated with the first and second merge candidates, and updating of the interpolation filter index is based on the bi-prediction weights.

At least one example of an embodiment described herein involves apparatus, further comprising the one or more processors being configured to determine bi-prediction weights associated with the first and second merge candidates, and update the interpolation filter index based on the bi-prediction weights.

At least one example of an embodiment described herein involves a computer program product including instructions, which, when executed by a computer, cause the computer to carry out a method according to any example of an embodiment described herein.

At least one example of an embodiment described herein involves a non-transitory computer readable medium storing executable program instructions to cause a computer executing the instructions to perform a method according to any example of an embodiment described herein.

At least one example of an embodiment described herein involves a signal comprising data generated according any example of a method described herein.

At least one example of an embodiment described herein involves a bitstream, formatted to include syntax elements and encoded image information in accordance with any example of a method described herein.

At least one example of an embodiment described herein involves a device comprising: apparatus according to any example of an embodiment described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

At least one example of an embodiment described herein involves a device comprising one of a television, a television signal receiver, a set-top box, a gateway device, a mobile device, a cell phone, a tablet, or other electronic device.

Various implementations described herein involve decoding. "Decoding", as used herein, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

In general, the examples of embodiments, implementations, features, etc., described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. One or more examples of methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users. Also, use of the term "processor" herein is intended to broadly encompass various configurations of one processor or more than one processor.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments are described herein. Features of these embodiments can be provided alone or in any combination, across various claim categories and types. Further, embodiments can include one or more of the following features, devices, or aspects, alone or in any combination, across various claim categories and types:

providing for encoding/decoding picture information
  involving deriving an inter-prediction parameter based
  on first and second merge candidates used to generate
  a pairwise merge candidate, wherein the inter-prediction parameter comprises at least one of an index for weighted bi-prediction or an interpolation filter index; and encoding/decoding at least a portion of the picture information based on the inter-prediction parameter;

providing for encoding/decoding picture information involving one or more processors configured to derive an inter-prediction parameter based on first and second merge candidates used to generate a pairwise merge candidate, wherein the inter-prediction parameter comprises at least one of an index for weighted bi-prediction or an interpolation filter index; and encode/decode at least a portion of the picture information based on the inter-prediction parameter;

providing for encoding/decoding picture information involving deriving an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and encoding/decoding at least a portion of the picture information based on the inter-prediction parameter;

providing for encoding/decoding picture information involving one or more processors configured to derive an inter-prediction parameter other than motion vector information and other than a reference picture index based on first and second merge candidates used to generate a pairwise merge candidate, wherein the inter-prediction parameter comprises at least one of an index for weighted bi-prediction or an interpolation filter index; and encode/decode at least a portion of the picture information based on the inter-prediction parameter;

providing for encoding/decoding picture information as described herein, wherein an index for weighted bi-prediction comprises a bi-prediction index associated with a bi-prediction weight, the first and second merge candidates have the same bi-prediction index, and the pairwise merge candidate has the bi-prediction weight;

providing for encoding/decoding picture information as described herein, wherein the index for weighted bi-prediction comprises a bi-prediction index associated with a bi-prediction weight, only one of the first and second merge candidates is a bi-directional candidate and a default value of the bi-prediction index is assigned to the pairwise merge candidate;

providing for encoding/decoding picture information as described herein, wherein the index for weighted bi-prediction comprises a bi-prediction index associated with a bi-prediction weight, only one of the first and second merge candidates is a bi-directional candidate and a value of the bi-prediction index associated with the bi-directional candidate is assigned to the pairwise merge candidate;

providing for encoding/decoding picture information as described herein, wherein the index for weighted bi-prediction comprises a bi-prediction index associated with a bi-prediction weight, the first and second merge candidates are a uni-directional type associated with respective first and second reference picture list, and deriving the inter-prediction parameter comprises generating a combined bi-directional merge candidate based on the first and second uni-directional merge candidates and assigning a default bi-prediction weight to the combined bi-directional merge candidate;

providing for encoding/decoding picture information as described herein, wherein the index for weighted bi-prediction comprises a bi-prediction index associated with a bi-prediction weight, the first and second merge candidates are a uni-directional type associated with respective first and second reference picture list, and the one or more processors being configured to derive the inter-prediction parameter comprises the one or more processors being configured to generate a combined bi-directional merge candidate based on the first and second uni-directional merge candidates and assign a default bi-prediction weight to the combined bi-directional merge candidate;

providing for encoding/decoding picture information as described herein, wherein the index for weighted bi-prediction comprises a bi-prediction index associated with a bi-prediction weight assigned to the combined pairwise merge candidate, such that a higher weight value is associated to an inter-prediction direction in which the combined bi-directional merge candidate points to a reference picture having a temporal distance closer to the current picture;

providing for encoding/decoding picture information as described herein, wherein the index for weighted bi-prediction comprises a bi-prediction index associated with a bi-prediction weight, the first and second merge candidates are of a bi-directional type with respective first and second different bi-prediction weights, and an average of the first and second weights is assigned to the pairwise merge candidate;

providing for encoding/decoding picture information as described herein, wherein the average of the first and second weights is rounded to either a closest value of an equal weight or away from the equal weight;

providing for encoding/decoding picture information as described herein, wherein the index for weighted bi-prediction comprises a bi-prediction index associated with a bi-prediction weight, the first and second merge candidates are of a bi-directional type having respective first and second weights, and further comprising determining the pairwise merge candidate only if the first and second weights are equal;

providing for encoding/decoding picture information as described herein, wherein the index for weighted bi-prediction comprises a bi-prediction index associated with a bi-prediction weight, the first and second merge candidates are of a bi-directional type having respective first and second weights, and further comprising the one or more processors being configured to determine the pairwise merge candidate only if the first and second weights are equal;

providing for encoding/decoding picture information as described herein, wherein deriving the inter-prediction parameter comprises searching among a plurality of merge candidates for the first and second merge candidates comprising a unidirectional merge candidate and a bi-directional merge candidate or two bi-directional merge candidates with equal weights;

providing for encoding/decoding picture information as described herein, wherein the one or more processors being configured to derive the inter-prediction parameter comprises the one or more processors being further configured to search among a plurality of merge candidates for the first and second merge candidates comprising a unidirectional merge candidate and a bi-directional merge candidate or two bi-directional merge candidates with equal weights;

providing for encoding/decoding picture information as described herein, wherein the bi-prediction weight comprises a generalized bi-prediction (GBi) weight or a bi-prediction with weight average (BPWA) weight or a bi-prediction with CU weight (BiCW);

providing for video encoding and/or decoding comprising deriving an interpolation-filter index in the case of a pairwise merge candidate;

providing for video encoding and/or decoding comprising deriving a value of an interpolation-filter index for a "pairwise-average" candidate, i.e., IF[PW], so that IF[PW] can be equal to a non-default value even if the interpolation-filter index for a candidate 0 (i.e., designated either IF[C0] or IF[0]) or the interpolation-filter index for candidate 1 (i.e., designated either IF[C1] or IF[1]) is equal to the default value;

providing for video encoding and/or decoding comprising deriving a value of IF[PW] as a function of the reference index values (i.e., designated "idx") of the candidates C0 and C1 (idx-00, idx-01, idx-10, idx-10);

providing for video encoding and/or decoding comprising deriving a value of IF[PW] wherein the deriving includes an initialization of IF[PW] to a maximum of IF[0], IF[1];

providing for video encoding and/or decoding comprising deriving a value of IF[PW] wherein the deriving includes an initialization of IF[PW] to a default value;

providing for video encoding and/or decoding comprising deriving a value of IF[PW], wherein the deriving includes an initialization of IF[PW] to the value of IF[0] if IF[0] equals IF[1], else IF[PW] is initialized to a default value;

providing for video encoding and/or decoding comprising deriving a value of IF[PW], wherein the deriving includes an initialization of IF[PW] to one of:
the maximum of IF[0], IF[1]; or
a default value; or
the value of IF[0] if IF[0] equals IF[1], else IF[PW] is initialized to a default value;

providing for video encoding and/or decoding comprising deriving a value of IF[PW] wherein the deriving includes:
initialization of IF[PW] according to any method described above; and
determining intermediate values IF[PW][r], r=0, 1, based on availability of motion vectors mv0r and mv1r, wherein
if both mv0r and mv1r are available: IF[PW][r]=IF[0]
else if mv0r only is available: IF[PW][r]=IF[0]
else if mv1r only is available: IF[PW][r]=IF[1]
else IF[PW][r]=IF[PW]
updating IF[PW] based on IF[PW][r];

providing for video encoding and/or decoding comprising deriving a value of IF[PW] as described above, wherein updating IF[PW] based on IF[PW][r] comprises setting IF[PW] to the maximum of IF[PW][0] and IF[PW][1];

providing for video encoding and/or decoding comprising deriving a value of IF[PW] as described above, wherein updating IF[PW] based on IF[PW][r] comprises setting IF[PW] to IF[PW][0] if IF[PW][0] equals IF[PW][1], else setting IF[PW] to a default value;

providing for video encoding and/or decoding comprising deriving a value of IF[PW] as described above, wherein updating IF[PW] based on IF[PW][r] comprises setting IF[PW] based on availability of motion vectors mv0r and mv1r such that:
if both mv0r and mv1r are available: IF[PW]=(IF[PW][0]||IF[PW][1])
else if mv0r only is available: IF[PW]|=IF[0]
else if mv1r only is available: IF[PW]|=IF[1]

providing for video encoding and/or decoding comprising deriving a value of IF[PW] as described above, wherein updating IF[PW] based on IF[PW][r] comprises setting IF[PW] based on availability of motion vectors mv0r and mv1r such that:
if both mv0r and mv1r are available: IF[PW]|=IF[0]
else if mv0r only is available: IF[PW]|=IF[0]
else if mv1r only is available: IF[PW]|=IF[1]

providing for video encoding and/or decoding comprising deriving a value of IF[PW] as described above, wherein determining intermediate values IF[PW] [r] is followed by
determining bi-prediction weights associated to candidate 0, e.g., gbiW[0][r], r=0, 1, if candidate 0 is a bi-prediction candidate and/or determining bi-prediction candidates associated to candidate 1, e.g., gbiW[0][r], r=0, 1, if candidate 1 is a bi-prediction candidate; and
updating IF[PW] is further based on the bi-prediction weights, wherein determining the bi-prediction weights and updating IF[PW] based on the bi-prediction weights are based on availability of motion vectors mv0r and mv1r in accordance with embodiment emb-3.1 as described herein;

providing for video encoding and/or decoding comprising deriving a value of IF[PW] as described above based on bi-prediction weights, wherein updating IF[PW] is based on embodiment emb-3.2 as described herein;

providing for video encoding and/or decoding comprising deriving a value of IF[PW] as described above based on bi-prediction weights, wherein updating IF[PW] is based on embodiment emb-3.3 as described herein;

providing for video encoding and/or decoding comprising deriving a value of IF[PW] as described above based on bi-prediction weights, wherein updating IF[PW] comprises setting IF[PW] to the maximum of IF[PW][0] or IF[PW][1];

providing for video encoding and/or decoding comprising deriving a value of IF[PW] as described above based on bi-prediction weights, wherein
a value of IF-index used for the motion compensation of L0 (or L1) is IF[PW][0] (or IF[PW][1] respectively), and wherein
the deriving further comprises storing a value of IF[PW] determined in accordance with any of the embodiments described herein.

providing a method or apparatus for video encoding and/or decoding comprising deriving an interpolation-filter index in the case of a pairwise merge candidate in accordance with any of the embodiments, features or entities, alone or in any combination, as described herein;

providing a method for video encoding and/or decoding comprising determining a first value of a first interpolation filter index associated with a pairwise average merge candidate and based on at least one of second and third interpolation filter indices associated with respective first and second merge candidates associated with the pairwise average merge candidate, determining an availability of at least one motion vector associated with the pairwise average candidate, and determining a second value of the first interpolation filter index based on at least one of the second and third interpolation filter indices and the availability of the at least one motion vector;

providing apparatus for video encoding and/or decoding comprising one or more processors configured for determining a first value of a first interpolation filter index associated with a pairwise average merge candidate and based on at least one of second and third interpolation filter indices associated with respective first and second merge candidates associated with the pairwise average merge candidate, determining an availability of at least one motion vector associated with the pairwise average candidate, and determining a second value of the first interpolation filter index based on at least one of the second and third interpolation filter indices and the availability of the at least one motion vector;

providing a method for video encoding and/or decoding comprising determining a first value of a first interpolation filter index associated with a pairwise average merge candidate and based on at least one of second and third interpolation filter indices associated with respective first and second merge candidates associated with the pairwise average merge candidate, determining an availability of at least one motion vector associated with at least one of the first and second merge candidates, determining if the at least one of the first and second merge candidates corresponds to a bi-prediction candidate, determining bi-prediction weights associated with the at least one of the first and second merge candidates corresponding to a bi-prediction candidate, and determining a second value of the first interpolation filter index based on at least one of the second and third interpolation filter indices and the availability of the at least one motion vector and the bi-prediction weights;

providing apparatus for video encoding and/or decoding comprising one or more processors configured for determining a first value of a first interpolation filter index associated with a pairwise average merge candidate and based on at least one of second and third interpolation filter indices associated with respective first and second merge candidates associated with the pairwise average merge candidate, determining an availability of at least one motion vector associated with at least one of the first and second merge candidates, determining if the at least one of the first and second merge candidates corresponds to a bi-prediction candidate, determining bi-prediction weights associated with the at least one of the first and second merge candidates corresponding to a bi-prediction candidate, and determining a second value of the first interpolation filter index based on at least one of the second and third interpolation filter indices and on the availability of the at least one motion vector and on the bi-prediction weights;

providing for a method or apparatus as described above wherein determining the first value of the first interpolation filter index comprises initializing the first interpolation filter index in accordance with any embodiment described herein, and determining the second value of the first interpolation index comprises:
determining at least one intermediate value of the first interpolation filter index in accordance with any embodiment described herein and based on the availability of the at least one motion vector, and
updating the at least one intermediate value in accordance with any embodiment described herein and based on the availability of the at least one motion vector and based on the at least one of the second and third interpolation filter indices;

providing for a method or apparatus as described above wherein determining the first value of the first interpolation filter index comprises initializing the first interpolation filter index in accordance with any embodiment described herein, and determining the second value of the first interpolation filter index comprises:
determining at least one intermediate value of the first interpolation filter index vector in accordance with any embodiment described herein based on the availability of the at least one motion vector,
determining the bi-prediction weights based on the at least one intermediate value in accordance with any embodiment described herein,
updating the at least one intermediate value in accordance with any embodiment described herein and based on the availability of the at least one motion vector and based on the bi-prediction weights and based on the at least one of the second and third interpolation filter indices;

providing a method for video encoding and/or decoding for deriving an interpolation-filter index in the case of a pairwise merge candidate in accordance with any of the embodiments, features or entities, alone or in any combination, as described herein based on providing reduced complexity and/or improved compression efficiency;

providing apparatus for video encoding and/or decoding for deriving an interpolation-filter index in the case of a pairwise merge candidate in accordance with any of the embodiments, features or entities, alone or in any combination, as described herein based on providing reduced complexity and/or improved compression efficiency;

providing in an encoder and/or decoder for deriving an interpolation-filter index in the case of a pairwise merge candidate in accordance with any of the embodiments, features or entities, alone or in any combination, as described herein based on providing reduced complexity and/or improved compression efficiency;

providing for a bitstream or signal that includes one or more of the described syntax elements, or variations thereof;

providing for a bitstream or signal that includes syntax conveying information generated according to any of the embodiments described;

providing for inserting in the signaling syntax elements that enable the decoder to operate in a manner corresponding to that used by an encoder;

providing for inserting in the signaling syntax elements that enable the encoder and/or decoder to provide encoding and/or decoding in accordance with any of the embodiments, features or entities, alone or in any combination, as described herein.

providing for selecting, based on these syntax elements, the features or entities, alone or in any combination, as described herein to apply at the decoder;

providing for creating and/or transmitting and/or receiving and/or decoding a bitstream or signal that includes one or more of the described syntax elements, or variations thereof;

providing for creating and/or transmitting and/or receiving and/or decoding a bitstream according to any of the embodiments described;

a method, process, apparatus, medium storing instructions, medium storing data, or signal according to any of the embodiments described;

a TV, set-top box, cell phone, tablet, or other electronic device that provides for applying encoding and/or decoding according to any of the embodiments, features or entities, alone or in any combination, as described herein;

a TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image;

a TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein;

a TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein;

a computer program product storing program code that, when executed by a computer encoding and/or decoding in accordance with any of the embodiments, features or entities, alone or in any combination, as described herein;

a non-transitory computer readable medium including executable program instructions causing a computer executing the instructions to implement encoding and/or decoding in accordance with any of the embodiments, features or entities, alone or in any combination, as described herein.

Various other generalized, as well as particularized embodiments are also supported and contemplated throughout this disclosure.

The invention claimed is:

1. A method for encoding picture information, comprising:
   deriving an inter-prediction parameter used to generate a pairwise merge candidate based on a first merge candidate and a second merge candidate, wherein the inter-prediction parameter comprises an interpolation filter index associated with the pairwise merge candidate;
   determining a value of a first interpolation filter index associated with the first merge candidate and a value of a second interpolation filter index associated with the second merge candidate;
   determining bi-prediction weights associated with the value of the first interpolation filter index and the value of the second interpolation filter index;
   setting a value of the interpolation filter index associated with the pairwise merge candidate to the value of the first interpolation filter index or to the value of the second interpolation filter index based on the bi-prediction weights; and
   encoding at least a portion of the picture information based on the inter-prediction parameter.

2. A method for decoding picture information, comprising:
   deriving an inter-prediction parameter used to generate a pairwise merge candidate based on a first merge candidate and a second merge candidate, wherein the inter-prediction parameter comprises an interpolation filter index associated with the pairwise merge candidate;
   determining a value of a first interpolation filter index associated with the first merge candidate and a value of a second interpolation filter index associated with the second merge candidate;
   determining bi-prediction weights associated with the value of the first interpolation filter index and the value of the second interpolation filter index;
   setting a value of the interpolation filter index associated with the pairwise merge candidate to the value of the first interpolation filter index or to the value of the second interpolation filter index based on the bi-prediction weights; and
   decoding at least a portion of the picture information based on the inter-prediction parameter.

3. An apparatus for encoding picture information, comprising:
   one or more processors configured to:
      derive an inter-prediction parameter used to generate a pairwise merge candidate based on a first merge candidate and a second merge candidate, wherein the inter-prediction parameter comprises an interpolation filter index associated with the pairwise merge candidate;
      determine a value of a first interpolation filter index associated with the first merge candidate and a value of a second interpolation filter index associated with the second merge candidate;
      determine bi-prediction weights associated with the value of the first interpolation filter index and the value of the second interpolation filter index;
      set a value of the interpolation filter index associated with the pairwise merge candidate to the value of the first interpolation filter index or to the value of the second interpolation filter index based on the bi-prediction weights; and
      encode at least a portion of the picture information based on the inter-prediction parameter.

4. An apparatus for decoding picture information, comprising:
   one or more processors configured to:
      derive an inter-prediction parameter used to generate a pairwise merge candidate based on a first merge candidate and a second merge candidate, wherein the inter-prediction parameter comprises an interpolation filter index associated with the pairwise merge candidate;
      determine a value of a first interpolation filter index associated with the first merge candidate and a value of a second interpolation filter index associated with the second merge candidate;
      determine bi-prediction weights associated with the value of the first interpolation filter index and the value of the second interpolation filter index;
      set a value of the interpolation filter index associated with the pairwise merge candidate to the value of the first interpolation filter index or to the value of the second interpolation filter index based on the bi-prediction weights; and decode at least a portion of the picture information based on the inter-prediction parameter.

5. A non-transitory computer readable medium storing executable program instructions to cause a computer executing the instructions to perform a method according to claim 1.

6. A non-transitory computer readable medium storing executable program instructions to cause a computer executing the instructions to perform a method according to claim 2.

* * * * *

UNITED STATES PATENT AND TRADEMARK OFFICE
CERTIFICATE OF CORRECTION

| | | |
|---|---|---|
| PATENT NO. | : 12,108,087 B2 | Page 1 of 1 |
| APPLICATION NO. | : 17/436266 | |
| DATED | : October 1, 2024 | |
| INVENTOR(S) | : Philippe Bordes et al. | |

It is certified that error appears in the above-identified patent and that said Letters Patent is hereby corrected as shown below:

On the Title Page

Item (54) and in the Specification, Column 1, Lines 1-3, Replace "INTER-PREDICTION PARAMETER DERVIATION FOR VIDEO ENCODING AND DECODING" with
-- "INTER-PREDICTION PARAMETER DERIVATION FOR VIDEO ENCODING AND DECODING" --

Signed and Sealed this
Third Day of December, 2024

Katherine Kelly Vidal
*Director of the United States Patent and Trademark Office*